United States Patent
Mattes et al.

(10) Patent No.: US 10,178,133 B2
(45) Date of Patent: *Jan. 8, 2019

(54) PERFORMING ACTIONS VIA DEVICES THAT ESTABLISH A SECURE, PRIVATE NETWORK

(71) Applicant: Tempered Networks, Inc., Seattle, WA (US)

(72) Inventors: David Mattes, Seattle, WA (US); Ludwin Fuchs, Seattle, WA (US)

(73) Assignee: Tempered Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,925

(22) Filed: Aug. 7, 2017

(65) Prior Publication Data
US 2018/0183834 A1 Jun. 28, 2018

Related U.S. Application Data

(63) Continuation of application No. 14/814,283, filed on Jul. 30, 2015, now Pat. No. 9,729,580.
(Continued)

(51) Int. Cl.
| | | |
|---|---|---|
| G06F 17/00 | (2006.01) | |
| H04L 29/06 | (2006.01) | |
| H04L 12/24 | (2006.01) | |

(52) U.S. Cl.
CPC .............. *H04L 63/20* (2013.01); *H04L 41/08* (2013.01); *H04L 63/0272* (2013.01);
(Continued)

(58) Field of Classification Search
CPC ..... H04L 63/20; H04L 63/0281; H04L 63/08; H04L 63/0272; H04L 63/0884; H04L 41/08
(Continued)

(56) References Cited

U.S. PATENT DOCUMENTS

| | | |
|---|---|---|
| 5,835,727 A | 11/1998 | Wong et al. |
| 6,981,156 B1 | 12/2005 | Stern et al. |

(Continued)

FOREIGN PATENT DOCUMENTS

| | | |
|---|---|---|
| WO | 2007038872 A1 | 4/2007 |
| WO | 2008039506 A2 | 4/2008 |

OTHER PUBLICATIONS

Asguard Networks, Inc., "SimpleConnectTM Product Information," Retrieved on Nov. 9, 2012, from http://www.asguardnetworks.com/product (1 page).

(Continued)

*Primary Examiner* — Mohammad W Reza
(74) *Attorney, Agent, or Firm* — John W. Branch; Lowe Graham Jones PLLC

(57) ABSTRACT

Embodiments are directed towards, gateway computers and management platform server computers for managing secure communication over a network. Gateway computer may intercept communications from unauthenticated source node computers directed to target node computers. If the unauthenticated node computer provides its credentials in response to a request for credentials from the gateway computer, the credentials and the intercepted communications may be provided to a management platform server for further processing. The management platform server may authenticate the unauthenticated source node computer based on its credentials and the intercepted communication and the management platform server may determine a target gateway computer that corresponds to the target node computer based on content of the intercepted communication. The management platform server may provide configuration information for generating a secure private network connection between the gateway computer and the target gateway computer.

20 Claims, 14 Drawing Sheets

Related U.S. Application Data

(60) Provisional application No. 62/030,608, filed on Jul. 30, 2014.

(52) U.S. Cl.
CPC .......... *H04L 63/0281* (2013.01); *H04L 63/08* (2013.01); *H04L 63/0884* (2013.01); *H04L 41/0668* (2013.01)

(58) Field of Classification Search
USPC .......................................................... 726/1
See application file for complete search history.

(56) References Cited

U.S. PATENT DOCUMENTS

| | | | |
|---|---|---|---|
| 7,209,956 | B2 | 4/2007 | Mache |
| 7,324,533 | B1 | 1/2008 | DeLiberato et al. |
| 7,373,660 | B1 | 5/2008 | Guichard et al. |
| 7,395,349 | B1 | 7/2008 | Szabo et al. |
| 7,796,593 | B1 | 9/2010 | Ghosh et al. |
| 7,881,199 | B2 | 2/2011 | Krstulich |
| 7,996,894 | B1 | 8/2011 | Chen et al. |
| 8,429,400 | B2 | 4/2013 | Khalid et al. |
| 8,489,701 | B2 | 7/2013 | Manion et al. |
| 8,607,301 | B2 | 12/2013 | Carrasco |
| 8,886,827 | B2 | 11/2014 | Goel et al. |
| 8,959,513 | B1 | 2/2015 | Swaminathan |
| 9,264,522 | B1 | 2/2016 | Reeves et al. |
| 2002/0026532 | A1 | 2/2002 | Maeda et al. |
| 2002/0073182 | A1 | 6/2002 | Zakurdaev et al. |
| 2002/0143855 | A1 | 10/2002 | Traversat et al. |
| 2003/0061479 | A1 | 3/2003 | Kimura |
| 2003/0081620 | A1 | 5/2003 | Danner et al. |
| 2004/0143628 | A1 | 7/2004 | Bradford et al. |
| 2004/0268121 | A1 | 12/2004 | Shelest et al. |
| 2005/0052999 | A1 | 3/2005 | Oliver et al. |
| 2005/0265355 | A1 | 12/2005 | Havala et al. |
| 2006/0190458 | A1 | 8/2006 | Mishina et al. |
| 2007/0019641 | A1 | 1/2007 | Pai et al. |
| 2007/0081530 | A1 | 4/2007 | Nomura et al. |
| 2007/0226781 | A1 | 9/2007 | Chen et al. |
| 2007/0230352 | A1 | 10/2007 | Kokku et al. |
| 2007/0258440 | A1 | 11/2007 | Watanabe |
| 2008/0072282 | A1 | 3/2008 | Willis et al. |
| 2008/0082823 | A1 | 4/2008 | Starrett et al. |
| 2008/0151916 | A1 | 6/2008 | Jetcheva et al. |
| 2008/0288614 | A1 | 11/2008 | Gil et al. |
| 2008/0307519 | A1 | 12/2008 | Curcio et al. |
| 2009/0034738 | A1 | 2/2009 | Starrett |
| 2009/0129374 | A1 | 5/2009 | Yurchenko et al. |
| 2009/0210518 | A1 | 8/2009 | Verma et al. |
| 2009/0310518 | A1 | 12/2009 | Jayaram et al. |
| 2010/0014533 | A1 | 1/2010 | Hirano et al. |
| 2010/0024026 | A1 | 1/2010 | Ylonen et al. |
| 2010/0027442 | A1 | 2/2010 | Chockler et al. |
| 2010/0042747 | A1 | 2/2010 | Hascalovici et al. |
| 2010/0214959 | A1 | 8/2010 | Kuehnel et al. |
| 2010/0218235 | A1 | 8/2010 | Ganot |
| 2010/0254395 | A1 | 10/2010 | Smith et al. |
| 2011/0016509 | A1 | 1/2011 | Huang et al. |
| 2011/0035466 | A1 | 2/2011 | Panirahi |
| 2011/0090892 | A1 | 4/2011 | Cooke |
| 2011/0103393 | A1 | 5/2011 | Meier et al. |
| 2011/0141881 | A1 | 6/2011 | Joshi et al. |
| 2012/0110203 | A1 | 5/2012 | Ozawa |
| 2012/0163196 | A1 | 6/2012 | Jansen et al. |
| 2012/0304243 | A1 | 11/2012 | Li et al. |
| 2013/0018993 | A1 | 1/2013 | Hui et al. |
| 2013/0083725 | A1 | 4/2013 | Mallya et al. |
| 2013/0198830 | A1 | 8/2013 | Nemoto et al. |
| 2013/0254264 | A1 | 9/2013 | Hankinson et al. |
| 2013/0283364 | A1 | 10/2013 | Chang et al. |
| 2014/0133354 | A1 | 5/2014 | Scharf et al. |
| 2014/0150070 | A1* | 5/2014 | Peterson ............. H04L 63/0272 726/4 |
| 2014/0223507 | A1 | 8/2014 | Xu |
| 2014/0282817 | A1 | 9/2014 | Singer et al. |
| 2014/0307744 | A1 | 10/2014 | Dunbar et al. |
| 2014/0348131 | A1 | 11/2014 | Duan et al. |
| 2015/0024677 | A1 | 1/2015 | Gopal et al. |
| 2015/0046997 | A1* | 2/2015 | Gupta ................. H04L 63/0272 726/7 |
| 2015/0067033 | A1 | 3/2015 | Martinsen et al. |
| 2015/0124823 | A1 | 5/2015 | Pani et al. |
| 2015/0135259 | A1 | 5/2015 | Ilyadis et al. |

OTHER PUBLICATIONS

Asguard Networks, Inc., "Welcome to Asguard Networks," Retrieved on Oct. 23, 2012, from http://www.asguardnetworks.com/ (1 page).

Asguard Networks, Inc., "SimpleConnectTM Quick Start Documentation Guide," Revision 1, Dec. 13, 2012 (18 pages).

Henderson, T. et al., "HIP-based Virtual Private LAN Service (HIPLS)," Network Working Group, Internet-Draft, The Boeing Company, Nov. 6, 2012 (16 pages).

International Search Report and Written Opinion for International Patent Application No. PCT/US2014/023632 dated Jun. 23, 2014 (13 pages).

Asguard Networks, Inc., "Gray Matter Systems Announces Asguard Networks Partnership at 2012 Gray Matter Systems Training and User Group Meeting," Aug. 9, 2012, retrieved on Oct. 23, 2012, from http://www.asguardnetworks.com/news (2 pages).

Trusted Computing Group, Incorporated, "TCG Trusted Network Connect: IF-MAP Metadata for ICS Security," Specification Version 1.0, Revision 44, May 8, 2014 (64 pages).

Office Communication for U.S. Appl. No. 14/740,053 dated Jul. 29, 2015, (10 pages).

Office Communication for U.S. Appl. No. 14/204,907 dated Jul. 10, 2015, (20 pages).

Aoyagi, S. et al., "ELA: A Fully Distributed VPN System Over Peer-to-Peer Network," Proceedings of the 2005 Symposium on Applications and the Internet, 2005, IEEE, Computer Society (4 pages).

Benyamina, D. et al., "Wireless Mesh Networks Design—A Survey," IEEE Communications Survey & Tutorials, vol. 14, No. 2, Second Quarter 2012, pp. 299-310.

International Search Report and Written Opinion for International Patent Application No. PCT/US2015/042993 dated Nov. 11, 2015, 11 pages.

Office Communication for U.S. Appl. No. 14/204,907 dated Dec. 2, 2015, (14 pages).

Official Communication for U.S. Appl. No. 15/156,254 dated Aug. 3, 2016, (13 pages).

Trusted Computing Group (Architects Guide; ICS Security Using TNC Technology, Oct. 2013, (6 pages).

Official Communication for U.S. Appl. No. 15/083,214 dated Oct. 25, 2016, (11 pages).

Office Communication for U.S. Appl. No. 14/740,053 dated Jan. 21, 2016, (18 pages).

Office Communication for U.S. Appl. No. 14/204,907 dated Feb. 24, 2016, (20 pages).

Official Communication for U.S. Appl. No. 15/083,214 dated Jul. 7, 2016, (11 pages).

Official Communication for U.S. Appl. No. 15/201,063 dated Nov. 2, 2016, (11 pages).

Official Communication for U.S. Appl. No. 15/156,254 dated Dec. 30, 2016, (13 pages).

Official Communication for U.S. Appl. No. 15/083,214 dated Jan. 9, 2017, (5 pages).

Official Communication for U.S. Appl. No. 15/156,254 dated May 5, 2017, (13 pages).

Official Communication for U.S. Appl. No. 15/083,214 dated Feb. 9, 2017, (10 pages).

Official Communication for U.S. Appl. No. 14/814,283 dated Jun. 9, 2017, (18 pages).

Official Communication for U.S. Appl. No. 15/201,063 dated Apr. 21, 2017, (14 pages).

(56) References Cited

OTHER PUBLICATIONS

Official Communication for U.S. Appl. No. 14/814,283 dated Nov. 30, 2015, (8 pages).
Official Communication for U.S. Appl. No. 14/814,283 dated Jun. 3, 2016, (10 pages).
Official Communication for U.S. Appl. No. 14/814,283 dated Aug. 23, 2016, (7 pages).
Official Communication for U.S. Appl. No. 14/814,283 dated Nov. 21, 2016, (10 pages).
Official Communication for U.S. Appl. No. 15/156,254 dated Oct. 19, 2017, 13 pages.
Lawton, "Machine-to-Machine Technology gears up for growth", 2004, pp. 12-15, IEEE Computer Society.
Official Communication for U.S. Appl. No. 15/987,762 dated Sep. 12, 2018, pp. 1-24.
Official Communication for U.S. Appl. No. 15/994,760 dated Oct. 1, 2018, pp. 1-22.
Official Communication for U.S. Appl. No. 15/670,859 dated Jun. 29, 2018, pp. 1-29.
Official Communication for U.S. Appl. No. 15/156,254 dated May 14, 2018, pp. 1-17.
Official Communication for U.S. Appl. No. 15/924,148 dated Jun. 5, 2018, pp. 1-24.

\* cited by examiner

PERFORMING ACTIONS VIA DEVICES THAT ESTABLISH A SECURE, PRIVATE NETWORK

CROSS-REFERENCE TO RELATED APPLICATIONS

This Utility Patent Application is a Continuation of U.S. patent application Ser. No. 14/814,283 filed on Jul. 30, 2015, issued as U.S. Pat. No. 9,729,580 on Aug. 8, 2017, which is based on U.S. Provisional Patent Application U.S. Ser. No. 62/030,608 filed on Jul. 30, 2014, entitled "PERFORMING ACTIONS VIA DEVICES THAT ESTABLISH A SECURE, PRIVATE NETWORK," the benefits of which are claimed under 35 U.S.C. § 120 and § 119(e), and which are each further incorporated by reference in their entireties.

TECHNICAL FIELD

The present invention relates generally to network management, and more particularly, but not exclusively, to managing network communication in an industrial networking environment.

BACKGROUND

Industrial equipment, such as manufacturing equipment used to build or assemble products, may be supported by industrial networking and/or communications networks. In industrial networks, the operation of machines that control industrial processes (e.g., manufacturing, machining, stamping, product packaging, or the like) may be arranged to communicate with other machines and/or computers over the industrial network. In some cases, such communication may be related to supervising and controlling operations of the various industrial machines. Also, the industrial network may be used for collecting data from the industrial machines for monitoring a manufacturing or assembly process, monitoring and improving operational efficiency, throughput, quality control, or the like.

In some cases, the communication/network protocols used in industrial communications networks may differ from, or be incompatible with, standard communications protocols used for common business networks. In some cases this may cause the establishment of connectivity relationships between the two types of networks challenging. In addition, many industrial communication systems were not designed with information security in mind, but now require secure connectivity to be compatible with business network security protocols, or to be compliant with regulatory standards. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DESCRIPTION OF VARIOUS EMBODIMENTS

Figure 1:
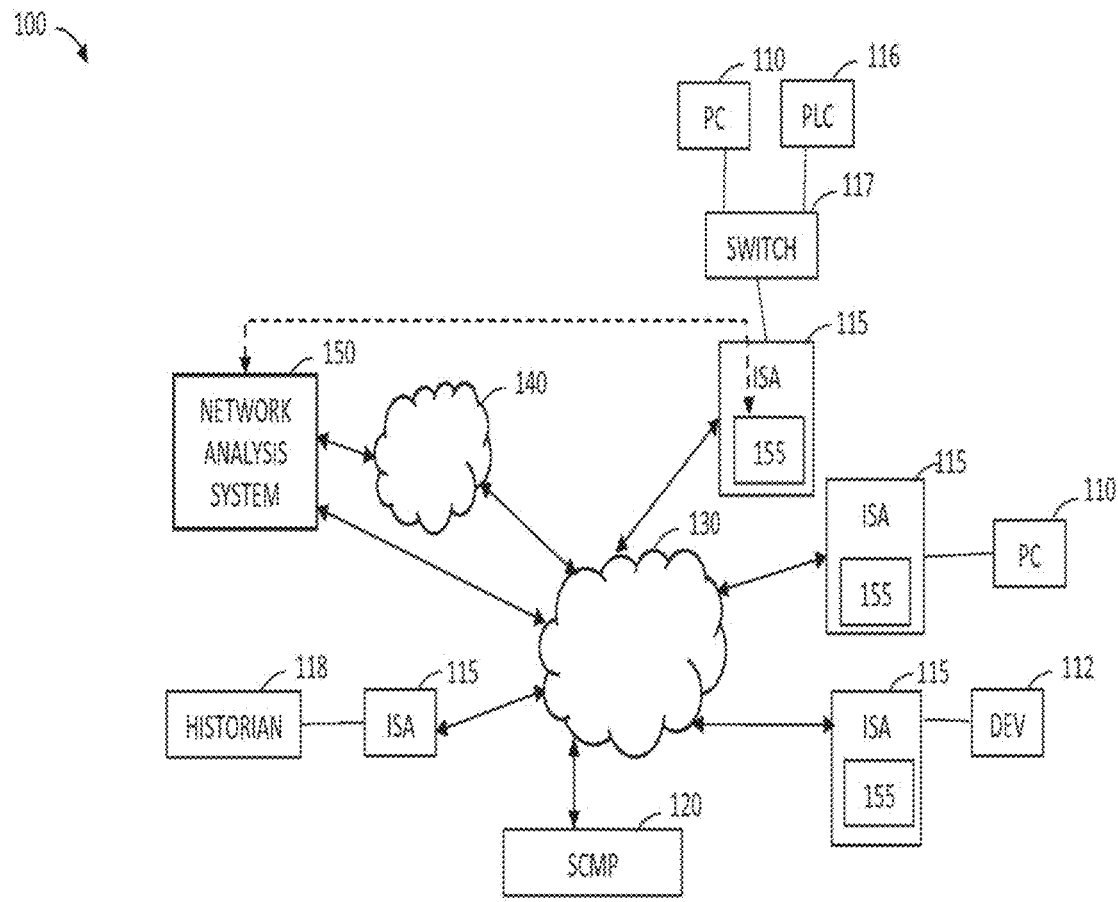
FIG. 1 is a block diagram illustrating one embodiment of a suitable network environment for collecting data from a private network.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the terms "mesh network," "industrial network" refer to a network of industrial computer/machines, workstations, client computers, gateway computers, traffic management computers, network monitoring computers, or the like. The term mesh network used herein describes both the typical network topology of a network in an industrial operation environment as well as more generally, a networked system used to perform operations in an industrial environment, such as, as factory floor, manufacturing complex, oil refinery, or the like. In the interest of clarity such networks (including machines and computers on the network) are referred to as mesh networks even when their topology and/or configuration is not strictly a "mesh" network and/or partial "mesh" network. In some cases, such networks may be referred to secure private networks herein.

As used herein the term "physical network" refers to the actual industrial communication network that interconnects one or more industrial machines/computers. The physical network may be a physical and/or native network device/components used to connect one or more industrial computers and/or industrial devices (machine) in a factory/industrial complex. Physical networks include network interfaces, wire, wireless hotspots, switches, routers, repeaters, or the like, that comprise the physical network Also, physical networks may be considered to include the native communication protocols, network topology, and so on, that may be used to setup a mesh network in an industrial environment. In some cases, physical networks may be arranged to enable open communication between node computers, (e.g., machines, workstations, and so on), gateway computer, or the like, that are on the physical network.

As used herein the terms "node," and "node computer" refer to computers that are endpoint computers interconnected over a physical network. Node computers may include client computers, network computers, industrial workstations, press machines, robots, packaging machines, automated milling machines, automated printing presses, pumps, valves, boilers, or the like. Node computers are considered to be computer/device connected to the physical network exclusive of gateway computers, network monitoring computer, and traffic management computers.

As used herein the terms "source node," and "source node computer" refer to a node computer that is the originating endpoint of a network communication.

As used herein the terms "target node," and "target node computer" refer to a node computer that is the ultimate intended destination of a communication. In some embodiments, a source node computer may be communicating to one or more other node computers over an industrial/mesh network. These intended recipients of these communication may be considered target node computers. Accordingly, a node computer may be a target node computer if it receives communications and it may be a source node computer if it sends communications.

As used herein the terms "gateway," "gateway computer," "industrial security computer," and "industrial security appliance" refer to computers connected to an industrial network that are disposed between the node computers and the physical network. Gateway computers may be network computers that may be arranged to provide security, access control, communication routing, or the like, for the mesh network. In some embodiments, gateway computer may be configured by another network computer, such as, a management platform server computer.

As used herein the terms "target gateway," and "target gateway computer" refer to one or more gateway computers that are disposed between the target node computers that may be the intended recipients of a communication in a mesh network.

As used herein the term "management platform computer," "management platform server computer" refer to one or more network computers that may be arranged to provide administrative and/or configuration services to one or more computer, such as, gateway computers, that may be in a mesh network.

As used herein the terms "network path," and "path" refer to a particular route between one or more endpoints through a physical network. A network path for given communication may be determined and/or enforced by a gateway computer. In some cases, network paths may be defined statically, in other cases, network paths may be determined dynamically.

As used herein the term "capability characteristics" refer to the capabilities of equipment coupled to one or more node computers on the secure private network and/or the node computer themselves. Capability characteristics may include, types of fasteners, nails, staples, glue, and so on, available at the equipment (e.g., industrial robot) Also, other capability characteristics may include, speed/cycle-rate, size, capacity, physical location, temperature, maintenance history, engineering tolerances, or the like, or combination thereof. Further, capability characteristics may include, energy consumption, voltage min/max, current min/max, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to collecting data, and performing actions associated with the collected data, from a private or secure network, are described. For example, the systems and methods may enable the collection of data from a large-scale, industrial secure network, such as a secure network that is established and controlled by a management component and multiple security appliances, management platform computers, industrial security computer, and industrial security appliances (ISA) that may couple one or more nodes and/or devices to a private secure network, industrial network, mesh network, or the like. In at least one of the various embodiments, one or more gateway computers, management platform server computers (e.g., SCMPs) may be arranged for managing secure communication over a network. In at least one of the various embodiments, the gateway computer may intercept communications from unauthenticated source node computers directed to one or more target node computers.

In at least one of the various embodiments, the gateway computer may generate instructions for a user-interface that enables a user to enter the credentials and provide the instructions to the unauthenticated source node computer. In at least one of the various embodiments, communication originating outside the network may be intercepted. Accordingly, in at least one of the various embodiments, the gateway computer may generate the requests for credentials based on one or more types of each intercepted communication.

In at least one of the various embodiments, if the unauthenticated node computer provides its credentials in response to a request for credentials from the gateway computer, the credentials and the intercepted communications may be provided to a management platform server for further processing.

In at least one of the various embodiments, the management platform server may authenticate the unauthenticated source node computer based on its credentials and the intercepted communication. Also, in at least one of the various embodiments, the management platform server may determine a target gateway computer that corresponds to the target node computer based on content of the intercepted communication. In at least one of the various embodiments, determining the target gateway computer, may further include determining the target gateway computer based on one or more rule-based policies.

Further, in at least one of the various embodiments, the management platform server may provide configuration information for generating a secure private network connection between the gateway computer and the target gateway computer. In at least one of the various embodiments, the configuration information for generating the secure private network connection may further include routing tables, firewall information, or the like, that enables the gateway computer to access the secure private connection and communicate with the target gateway computer.

Also, in at least one of the various embodiments, the configuration information for the secure private network connection may be generated based on one or more characteristics of the secure private network characteristics, including, current performance of the secure private network, expected performance of the secure private network, performance of node computers on the secure private network, performance and capabilities of equipment coupled to one or more node computers on the secure private network, or the like, or combination thereof.

Accordingly, in at least one of the various embodiments, the gateway computer may establish a secure private network connection to the target gateway computer based on the configuration information. Enabling, in at least one of the various embodiments, the gateway computer to securely send the intercepted communications to the target gateway computer over the secure private network connection such that the target gateway computer securely provides the intercepted communication to the target node computer.

In at least one of the various embodiments, the management platform server may pair the gateway computer with one or more other gateway computers. In at least one of the various embodiments, the management platform server may generate a unique identifier for the gateway computer and a separate unique identifier for each of the other gateway computers. In at least one of the various embodiments, the management platform server may generate a single shared identifier and associating it with the gateway computer and the one or more other gateway computers. In at least one of the various embodiments, the management platform server may modify the configuration information for the secure private network connection based on the unique identifier for the gateway computer and the separate unique identifiers for each of the other gateway computers. Accordingly, in at least one of the various embodiments, if the gateway computer fails, one of the one or more other gateway computers to replace operation of the gateway computer may be determined based on at least the shared identifier.

Examples of Collecting Data from a Secure, Private, Network

FIG. 1 illustrates a suitable network environment 100 for collecting data from a private network. In at least one of the various embodiments, the computers, machines, databases, or devices shown in FIG. 1 and other Figures described herein may be implemented in a client computer (See, FIG. 11) or a network computer (See, FIG. 12) that is modified by software and/or hardware to be a special-purpose computer to perform the functions described herein for that machine, database, or device. Moreover, any two or more of the computers, machines, databases, or devices illustrated in FIG. 1 may be combined into a single machine, and the functions described herein for any single machine, database, or device may be subdivided among multiple machines, databases, or devices.

As described herein, network environment 100 may include various devices that communicate with one another over a secure private network, such as secure private network 130, established by central management component 120 that manages and/or controls various security appliances 115 (e.g., industrial security appliances, or ISAs) that facilitate the access of the secure, private network by the devices. For example, the devices may include personal computers (PC) 110, such as mobile devices, laptops, and other user devices, programmable logic controllers (PLC) associated with electromechanical systems and devices (e.g., machine tools, utilities, and so on), such as PLC 116 that connects to ISA 115 via switch 117, developer devices (DEV) 112, historian devices 118, and so on.

In some embodiments, the management component may be a physical and/or virtual component that establishes secure private network 130 and delegates management of network 130 to users, defines automation devices (PLC 116) behind ISAs 115, configures the communication security policies for ISAs 115 and well as the various devices, such as, PC 110, DEV 112, PLC 116, or the like, and monitors secure private network 130, and so on. As an example, in at least one of the various embodiments, configuration includes management component 120 and two ISAs 115, which connect devices to network 130. The secure, private network may employ network whitelisting allowing only the communications specified in the whitelist to be communicate over network 130. For example, in at least one of the various embodiments, each ISA 115 may have a unique cryptographic identity and the collection of ISA identities may establish network 130. In at least one of the various embodiments, if ISAs 115 determine the peer ISAs they are allowed to communicate with, the ISAs may stablish point-to-point secure (VPN) tunnels to one another. In at least one of the various embodiments, network devices 110, 112, 116 behind each ISA 115 may communicate with one another as if they are connected to each other on a local switch, yet their communications may be secured over an untrusted shared network. Additionally, in at least one of the various embodiments, ISAs 115 may enforce the user-defined communications security policies as defined in the management component 120 (e.g., management platform server computer), to further manage network device connectivity.

In some embodiments, ISA 115 may include data collection device 155 that may be arranged to collect data, such as network performance or traffic data, from network 130. In at least one of the various embodiments, data collection device 155 may be supported or contained by the ISA 115, which may establish a point-to-point VPN tunnel with other ISAs 115, and/or management component 120 that may enable data collection device 155 to collect data from the ISAs, management component 120, and so on. By providing data collection device 155 with access to ISA 115 (or, other security appliances), various types of network data may be collected from network 130 without utilizing other additional hardware or devices.

Thus, in at least one of the various embodiments, one or more of the ISAs may include a security component or device configured to connect a device or utility to a secure private network via a secure communication path established between the device or utility and another device or utility of the secure, private network and a data collection component (e.g., data collection device 155) configured to collect data associated with the secure private network via the established secure communication path.

For example, in at least one of the various embodiments, data collection device 155 may access or monitor communication traffic within the secure private network via ISA 115, and collect data or other information associated with the communication traffic. Example data or other information that may be collected includes network performance data (e.g., bandwidth, dropped packets, exception reporting), automation data (e.g., OPC, DNP3, Modlous), Quality of Service (QoS) characteristics, or the like.

In some embodiments, network analysis system 150 may receive the collected data, analyze the data, perform actions based on the analysis of the data, or the like. The network analysis may access data collection device 155 and/or the secure private network 130 directly and/or via unsecured network 140.

In at least one of the various embodiments, network analysis system 150 may perform various actions based on the data collected by data collection device 155, such as actions that render or visualize the performance of the network, actions that modify the operations of the network (e.g., dynamic adjustments to traffic on the network), and so on.

Accordingly, in at least one of the various embodiments, the systems and methods described herein may facilitate the collection of data from the secure private network 130 via a data collection device, such as, data collection device 155 that may be associated with ISA 115 (e.g., authenticated on the network 130) and may establish secure communication tunnels with other devices and/or components on network 130, and perform actions associated with network 130 based on algorithms or other processes performed by network analysis system 150, which is not authenticated on the network 130.

Figure 2:
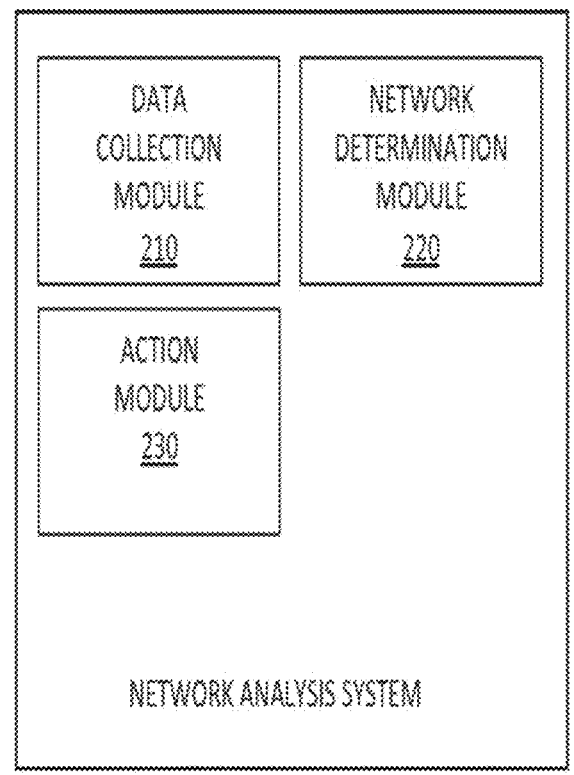
FIG. 2 is a block diagram illustrating the components of one embodiment of network analysis system in accordance with at least one of the various embodiments.

FIG. 2 is a block diagram illustrating the components of a network analysis system in accordance with at least one of the various embodiments. In at least one of the various embodiments, network analysis system 150 may include one or more modules and/or components to perform one or more operations of network analysis system 150. The modules may be hardware, software, or a combination of hardware and software, and may be executed by one or more processors. For example, network analysis system 150 may include data collection module 210, network determination module 220, action module 230, or the like.

In some embodiments, data collection module 210 may be arranged to collect data from the secure, private network via a data collection device within an industrial security appliance. For example, data collection module 210 may access, receive, retrieve, or otherwise collect data from data collection device 155 of one or more ISAs 115 that may assist in generating and maintaining secure private network 130. Example data or other information that may be collected includes network performance data (e.g., bandwidth, dropped packets, exception reporting), automation data (e.g., OPC, DNP3, Modulus), Quality of Service (QoS) characteristics, and so on.

In at least one of the various embodiments, data collection device 155 may be part of an established a point-to-point virtual private network between industrial security appliance 115 and management component 120 that manages operations of the secure, private, network, and collect data from management component 120 via the established point-to-point virtual private network and/or from historian device 118 via the established point-to-point virtual private network.

In some embodiments, network determination module 220 may be arranged to determine network characteristics based on an analysis of the collected data. For example, network determination module 220 may analyze the data collected at ISAs 115 of network 130 and identify or determine a current performance of the network, such as an expected performance, an abnormal performance, performance of running processes, performance of machine tools, utilities, nodes, connected to the network, capabilities of machine tools, utilities, nodes, or the like.

In some embodiments, action module 230 is arranged to perform an action based on the determined network characteristics. For example, action module 230 may perform an action to render a visual display that depicts the current performance of the secure, private network, modify traffic operations within the secure, private network, send an alert or other message in response to an intrusion within the secure, private network, update or modify running processes with the network, and so on.

Figure 3:
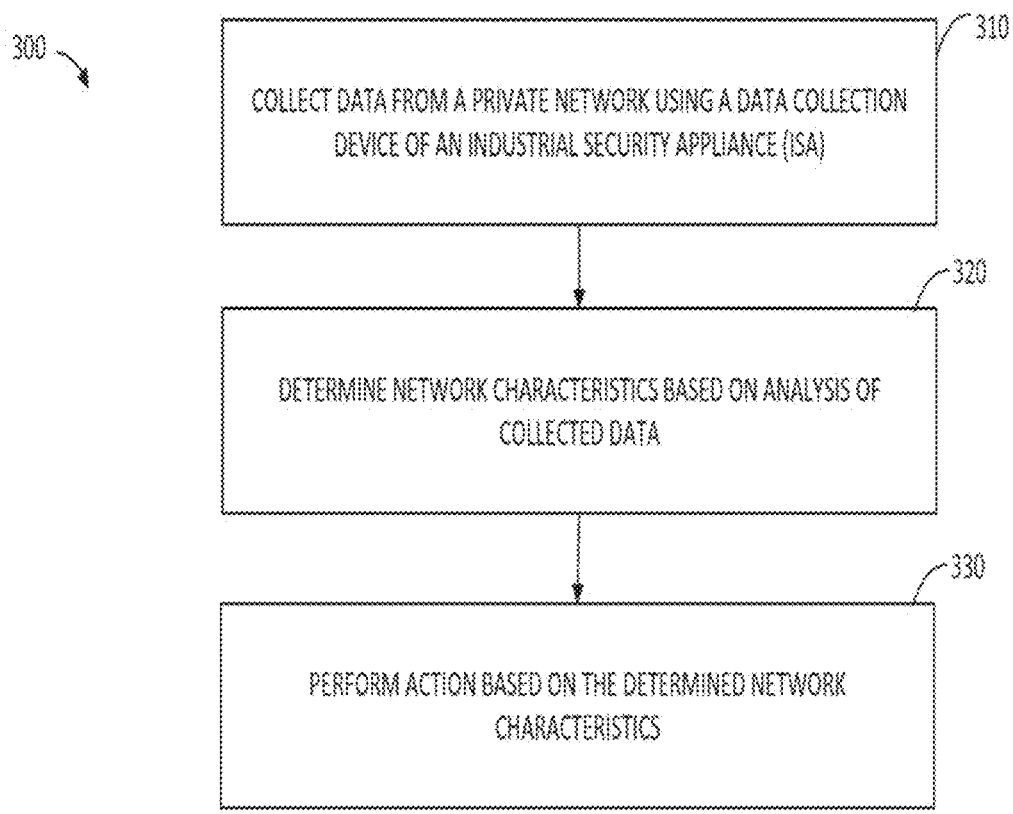
FIG. 3 illustrates an overview flowchart illustrating a method for performing an action based on data collected from a private network in accordance with at least one of the various embodiments.

In at least one of the various embodiments, network analysis system 150 may perform various processes or operations if collecting data from secure private network 130 and performing actions in response to the collected data. FIG. 3 is a flow diagram illustrating process 300 for performing an action based on data collected from a private network. Process 300 may be performed by network analysis system 150 and, accordingly, is described herein merely by way of reference thereto. At block 310, network analysis system 150 may collect data from the secure, private network via data collection device 155 within industrial security appliance 115. At block 320, network analysis system 150 may determine network characteristics based on an analysis of the collected data. At block 330, network analysis system 150 performs an action based on the determined network characteristics.

Authenticating Devices to a Secure Private Network

Figure 4:
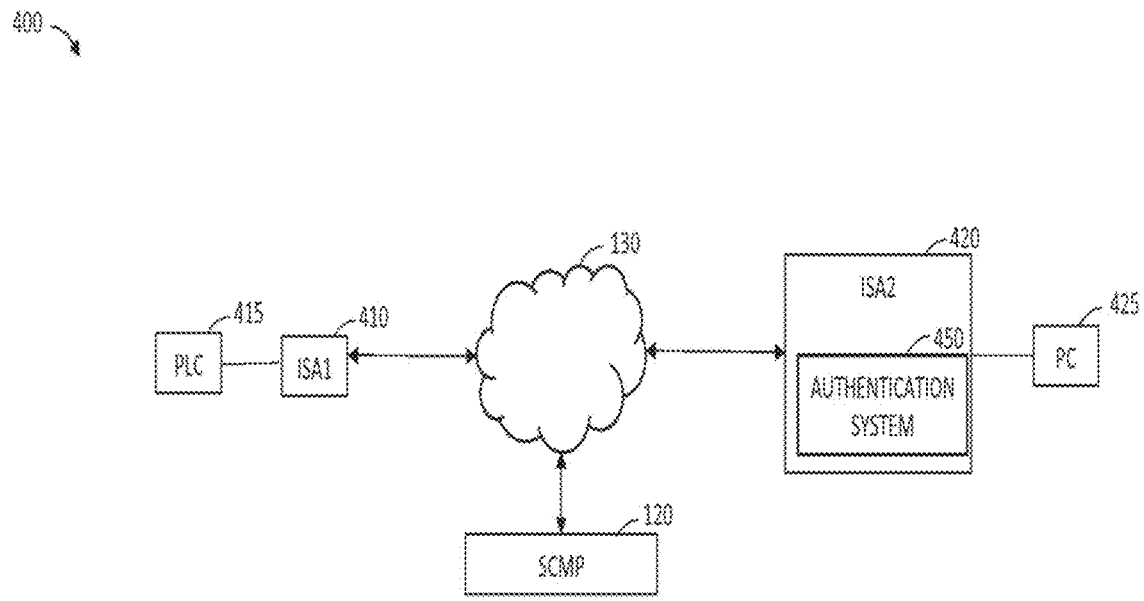
FIG. 4 is a logical diagram illustrating one embodiment of a suitable network environment for two factor authentication of a device on a private network in accordance with at least one of the various embodiments.

FIG. 4 is a block diagram illustrating network environment 400 for two-factor authentication of a device on a private network, such as secure private network 130 in accordance with at least one of the various embodiments. Network environment 400 includes a first device, PLC 415, connected to private network 130 via first ISA 410, and a second device, PC 425, connected to network 130 via second ISA 420, that includes, supports, contains, or may be associated with authentication system 450 that may be configured to perform operations to authenticate devices with network 130. As described herein, ISA 410, ISA 420, and SCMP 120 establish secure private network 130.

Figure 5:
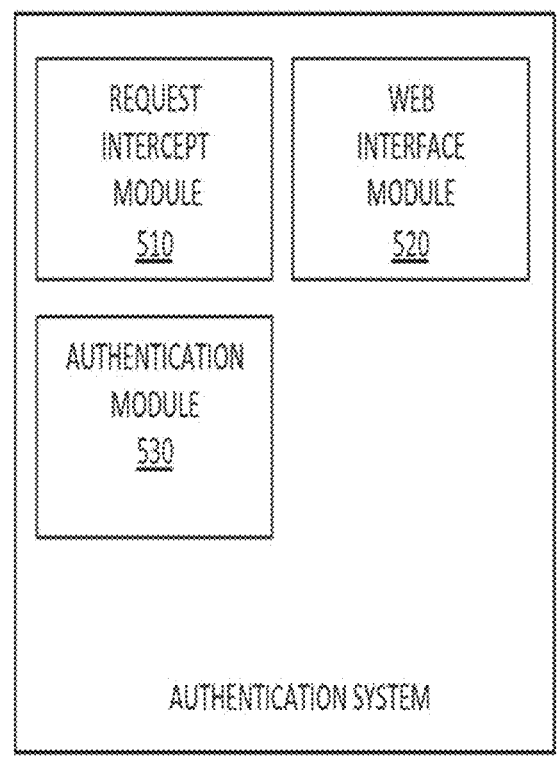
FIG. 5 illustrates the logical components of an authentication system in accordance with at least one of the various embodiments.

FIG. 5 illustrates the logical components of authentication system 450 in accordance with at least one of the various embodiment. In at least one of the various embodiments, authentication system 150 may include one or more modules and/or components to perform one or more operations of authentication system 450. The modules may be hardware, software, or a combination of hardware and software, and may be executed by one or more processors. For example, authentication system 450 include request intercept module 510, web interface module 520, authentication module 530, or the like.

In some embodiments, request intercept module 510 may be arranged to intercept, at an industrial security appliance, a TCP request or other network communication that requests to connect to secure private network 130 from a requesting device associated with the industrial security appliance. For example, request intercept module 510 may intercept a request provided by PC 425 at second ISA, ISA 420.

In some embodiments, web interface module 520 may be arranged to present, via the industrial security appliance, an application for obtaining authentication credentials from a user. In at least one of the various embodiments, web interface module 520 may generate a web interface and provide it to the requesting device. In some embodiments, the web interface may be employed to collect authentication credentials from the requesting device. For example, web interface module 520 may present an interface to PC 425 and receive certain credentials (e.g., a username, password, passphrase, or the like), via the interface.

In at least one of the various embodiments, web interface module 520 may be arranged to provide one or more APIs, such as, a REST API, or the like, that enables applications to be arranged to communicate and/or perform transactions to obtain/establish authentication credentials. In some embodiments, one or more applications executing on PC 425 may be arranged to communicate using an API provided by web interface model 520 rather than being limited to providing a web interface (e.g., web page.)

In some embodiments, authentication module 530 may be arranged to send or transmit a network communication, such as a TCP request, that includes the authentication credentials to a management component of the secure private network, and establishes, or causes establishment of, a point-to-point virtual private network between the industrial security appliance associated with the requesting device and another industrial security appliance associated with another device on the secure private network. For example, a source node may attempt to communicate with a target node over the secure private network. Accordingly, in at least one of the various embodiments, a ISA communicatively coupled to the source node may act as the source node's gateway computer that provides access to the secure private network. Likewise, the ISA coupled to the target node may act as the target node's gateway computer. As described above, if the authentication credentials are validated, the management platform may establish a point-to-point network path between the source node's gateway computer and the target node's gateway computer.

Figure 6:
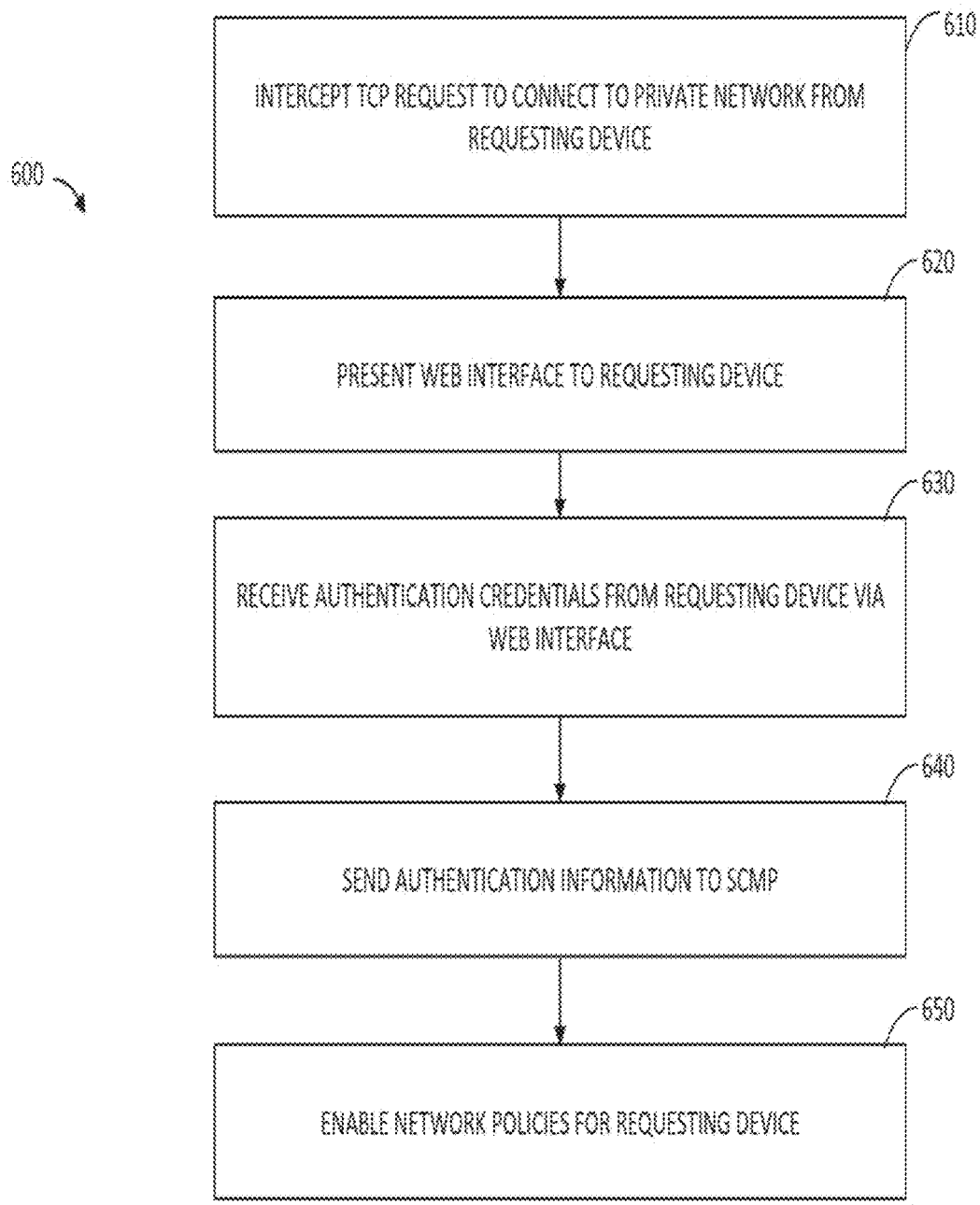
FIG. 6 illustrates a flowchart for a process for authenticating a device on a private network in accordance with at least one of the various embodiments.

FIG. 6 illustrates a flowchart for process 600 for authenticating a device or node computer on a private network in accordance with at least one of the various embodiments. Process 600 may be performed by authentication system 450 and, accordingly, is described herein merely by way of reference thereto. In at least one of the various embodiments, authenticating a device or node computer may include the use of public key infrastructure that may be used to exchange keys, private secure certificates, user credentials, and/or other cryptographic information.

At block 610, in at least one of the various embodiments, authentication system 450 may intercept, at an industrial security appliance, a network communication, such as, a TCP request, to connect to a secure private network from a requesting device associated with the industrial security appliance. In at least one of the various embodiments, the request may be communication request from a source node directed to a target node, each of which may be coupled with one or more ISAs or gateway computers.

In at least one of the various embodiments, authentication system 450 may be arranged to capture all network communication from outside the secure network. In at least one of the various embodiments, authentication system 450 may generate a response based on the type of network communication. In some cases, network communications may be discarded in other cases, network communications may cause authentication module 450 to initiate an authentication transaction, In at least one of the various embodiments, the particular response may be determined based on configuration information that may include one or more rule-based policies. In at least one of the various embodiments, such rule-based policies may be encoded in hardware, software, scripts, or the like, or combination thereof.

At block 620, in at least one of the various embodiments, authentication system 450 may provide, via the industrial security appliance (e.g., gateway computer) a web interface to the requesting device (e.g., source node). In at least one of the various embodiments, authentication module 450 may be arranged to respond to incoming HTTP requests. In at least one of the various embodiments, if the incoming HTTP communication is provided from an unauthenticated source, authentication model 450 may generate and respond with a HTML page that may provide a user interface to enable users to provide authentication information (e.g., credentials). For example, in at least one of the various embodiments, the authentication system may generate a response that includes HTML content for displaying a user login interface on the source node that initiated the request.

In at least one of the various embodiments, applications executing on an external computer, such as PC 425, may be arranged to communicate with the ISA, gateway computer, target node, or private network, using other APIs or methods, such as, HTTP based REST APIs, TCP/IP ports, USB/Serial, Bluetooth, or the like, or combination thereof. In additional to common network protocols, such as, HTTP, HTTPS, RTSP, or the like, ISAs or gateway computer may be arranged to support various protocols that may be operative in an industrial environment, such as, Ethernet/IP, Common Industrial Protocol (CIP), Modbus, C-Bus, or the like, or combination thereof.

At block 630, in at least one of the various embodiments, authentication system 450 may receive, via the presented web interface, authentication credentials from the requesting device. In at least one of the various embodiments, applications running on computers outside of the secure network may be arranged to provide authentication credentials using other APIs that may be provided by authentication system 450. In some embodiments, one or more transactions between the user and the authentication system may be used to obtain the authentication credentials. Also, in at least one of the various embodiments, two-factor authentication may also be used.

At block 640, in at least one of the various embodiments, authentication system 450 may provide the network communication (e.g., the TCP request and the authentication credentials) to a management component of the secure private network, such as a management platform server. In at least one of the various embodiments, authentication system 450 may collect the authentication credentials provided by the source node/external computer (e.g., PC 425) and communicate them to SCMP 120 to validate the provided credentials and to determine the access rights to the secure network that may be associated with the credentials, if any.

At block 650, authentication system 450 may establish a point-to-point virtual private network between the industrial security appliance (or source gateway computer) associated with the requesting device (the source computer) and another industrial security appliance (the target gateway computer).

In at least one of the various embodiments, the routing tables, firewall information, or the like, for enabling the requesting source node computer to access the private network may be generated by SCMP 120 and communicated to authentication system 450. Accordingly, in at least one of the various embodiments, the policies that may be applied to the requesting source node computer may be established SCMP 120 and provided over the private network to authentication system 450. In some embodiments, ISAs, such as ISA 410 and ISA 420 are unable to establish network policies and/or generate the configuration information that may be required to provide access to the private network.

In some embodiments, SCMPs, such as, SCMP 120 may be arranged to determine the network policies and/or access levels that may be established for the requesting computer based on the authentication credentials provided to an ISA by the requesting computer. Accordingly, in at least one of the various embodiments, SCMPs may provide network configuration to the ISAs that enable to ISAs to enable to the requesting computer to access to the private network. Likewise, in at least one of the various embodiments, the requesting computer does not access the SCMP directly.

In at least one of the various embodiments, the network configuration information may be generated based on the topology of the physical network and/or mesh network that may comprise the secure private network. In at least one of the various embodiments, the SCMP may determine network path through the physical network based on one or more characteristics of the network, one or more characteristics of the communication/requests from the source node, capabilities of the target nodes and/or industrial devices coupled with the target nodes, or the like, or combination thereof.

Next, control may be returned to a calling process.

High Availability in a Secure Private Network

Figure 7:
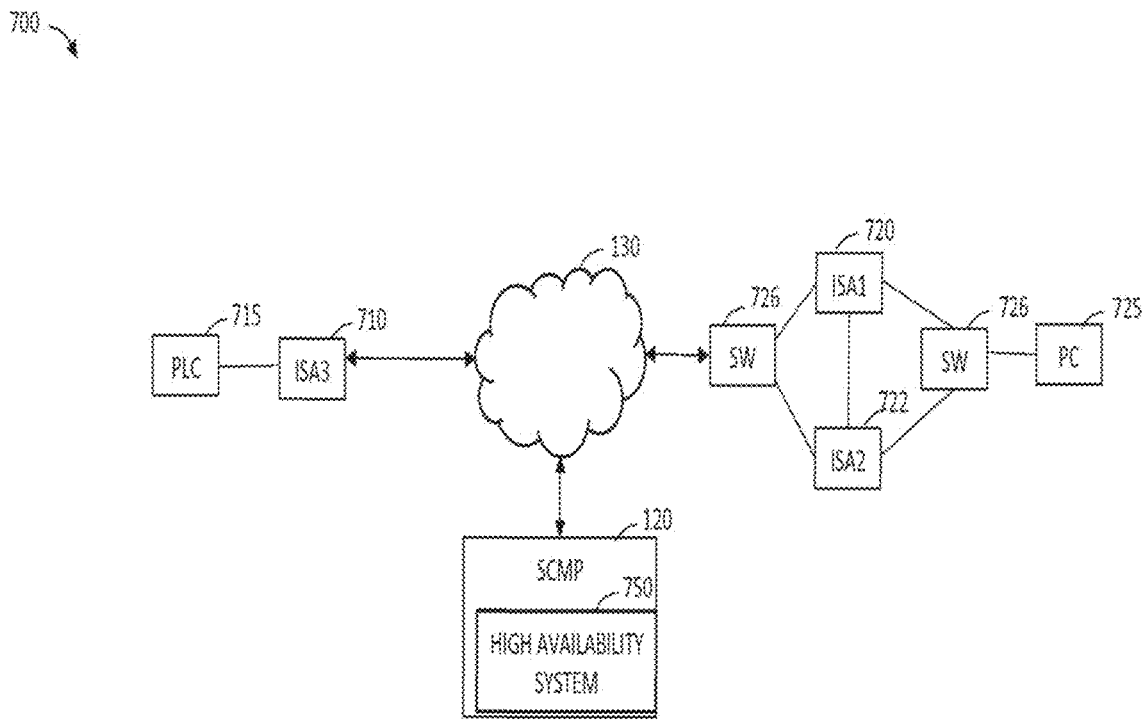
FIG. 7 illustrates the logical components of a network environment for providing high availability to devices that access a private network in accordance with at least one of the various embodiments.

FIG. 7 is a block diagram illustrating network environment 700 for providing high availability to devices that access a private network in accordance with at least one of the various embodiments. In at least one of the various embodiments, network environment 700 may include PC 725 that may be securely connected to secure private network 130 via one of a pair of ISAs, first ISA 720 or second ISA 722, and multiple switches 726, and PLC 715 that may be securely connected to the network 130 via third ISA 710. As described herein, first ISA 720, second ISA 722, third ISA 710, and the management component 120 establish secure private network 130. One of ordinary skill in the art will appreciate that network environment 700 is a non-limiting example. Accordingly, in at least one of the various embodiments, network environments may have more or fewer computers and/or devices as shown herein.

In some embodiments, management component 120 (or, one or more of the ISAs) may include high availability system 750 that may be configured to provide high availability access and secure connections within secure private network 130.

Figure 8:
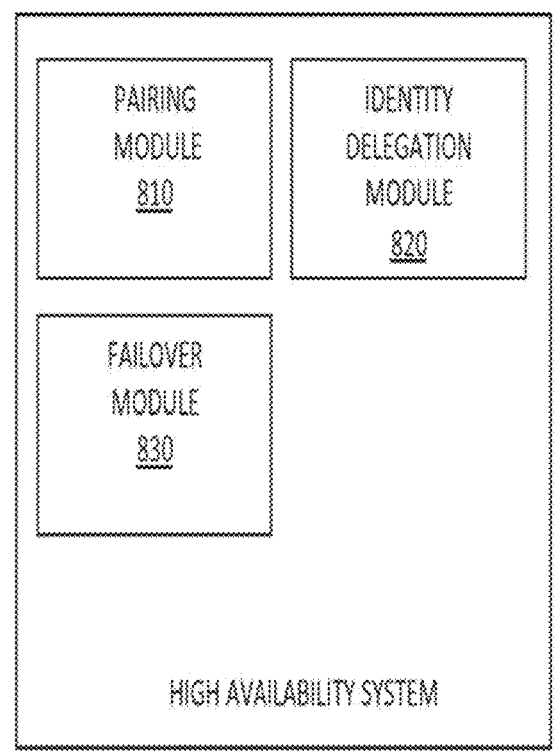
FIG. 8 illustrates the logical components of a high availability system in accordance with at least one of the various embodiments.

FIG. 8 illustrates the logical components of high availability system 750 in accordance the at least one of the various embodiments. In at least one of the various embodiments, high availability system 750 may include one or more modules and/or components to perform one or more operations of high availability system 750. In at least one of the various embodiments, modules may be hardware, software, or a combination of hardware and software, and may be executed by one or more processors. For example, in at least one of the various embodiments, high availability system 750 may include pairing module 810, delegation module 820, and failure module 830.

In some embodiments, pairing module 810 may be arranged to generate a shared identity between a first industrial security appliance paired a second industrial security appliance. In at least one of the various embodiments, the shared identity may be a single cryptographic key, cryptographic hash, cryptographic certificate, or the like, that may be mapped to two or more ISAs or gateway computers. Pairing module 810 may associate one or more properties of the ISAs with the shared identity. For example, in at least one of the various embodiments, the shared identity may be paired based on one or more features of the ISAs, such as, the MAC address, or other unique identifier of the ISAs. Further, in at least one of the various embodiments, identity delegation module 820 may be arranged to generate a unique cryptographic identity value for each ISA as well. Accordingly, in this example, first ISA 720 and second ISA 722 may each be associated with a unique identity and the same shared identity. In at least one of the various embodiments, the shared identity enables ISAs, management components, management platform servers, gateway computers, and/or other computers, to determine if two or more ISAs are paired. Accordingly, in at least one of the various embodiments, one of the paired ISAs may be substituted for a failed partner ISA.

In some embodiments, delegation module 820 may be arranged to transfer the shared identity to a third industrial security appliance or gateway computer along with a first unique identity for the first industrial security appliance and a second unique identity for the second industrial security appliance, and establish a secure connection between the third industrial security appliance and the first industrial security appliance based on the first unique identity for the first industrial security appliance.

In at least one of the various embodiments, the unique identity (e.g., cryptographic key, cryptographic hash, cryptographic certificate, or the like) may be employed to establish the identity of the ISA that is being used to enable the outside computer to communicate with the secure private network. Also, in some embodiments, the ISA's unique identity may be employed to establish secure communications paths in the secure private network. For example, a unique identity may be used to validate that the ISA is enabled to participate in network communication in the secure private network. Also, in at least one of the various embodiments, the unique identity may be used as a key or part of a key used to encrypt communication over the secure connections.

In at least one of the various embodiments, the shared identity may be used for determining one or more ISA pairs rather than used for establishing secure communications on the secure private network. For example, in at least one of the various embodiments, if an ISA fails the shared identifier may be used to determine which ISA should take over for the failed ISA. Accordingly, in at least one of the various embodiments, the shared identity may be stored in a data store and/or table associating it with the unique identities of its paired ISAs.

In some embodiments, failure module 830 may be arranged to determine failures that may occur at the first industrial security appliance, and establish a secure connection between the third industrial security appliance and the second industrial security appliance (the failover ISA) based on the shared identity. For example, in at least one of the various embodiments, if an ISA is determined to be offline, or otherwise in a failure state, failure module 830 may determine the shared identity that is associated with the failed ISA and use it to determine the surviving paired ISA (if any).

In at least one of the various embodiments, failure module 830 may be arranged to monitor one or more heartbeat communications from the each ISA in the secure private network. Accordingly, in at least one of the various embodiments, if a heartbeat message is not received from an ISA within a define duration, the failure module may determine that the corresponding ISA may have failed. Also, in at least one of the various embodiments, the ISA pairs may be arranged to monitor and exchange heartbeat messages with each other and send a communication message to failure module 830 if either of the ISAs determine that its peer may have failed.

As described herein, high availability system 750 may perform processes or operations in order to establish secure connections between devices, such as between a device at a single ISA and a device that shares multiple ISAs. (See, FIG. 6.) In at least one of the various embodiments, high availability system 750 may generate network configuration information that establishes secure communication paths between the ISAs, industrial devices, and computers, or the like, that are within the secure private network.

Figure 9:
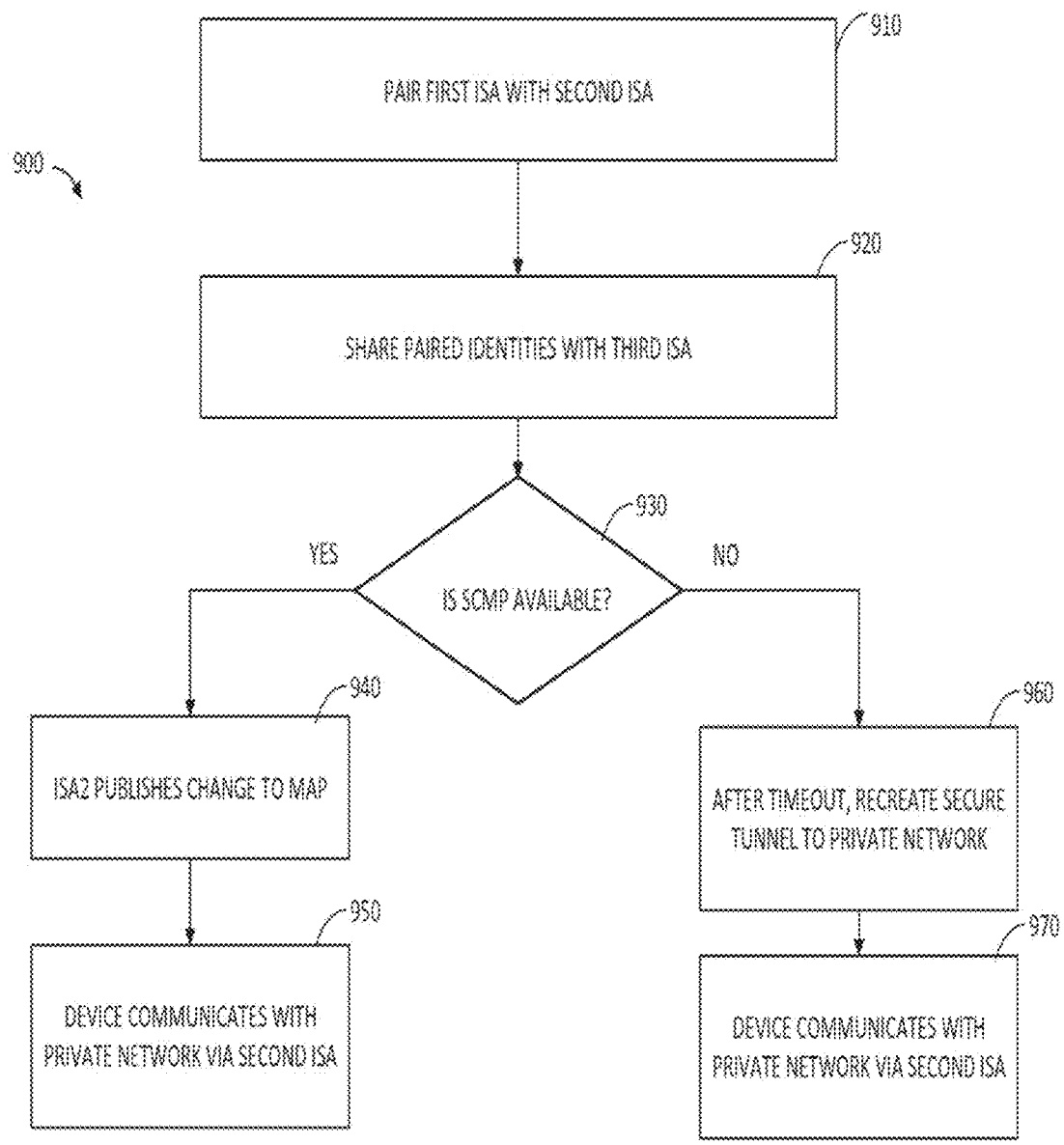
FIG. 9 illustrates a flowchart for a process for providing a device with access to a private network in accordance with at least one of the various embodiments.

FIG. 9 illustrates a flowchart for process 900 for providing a device or computer with access to a private network in accordance with at least one of the various embodiments. At block 910, high availability system 750 pairs a first ISA with a second ISA, both of which may be associated with a single device, computer, and/or node on the network.

At block 920, high availability system 750 may share the paired identity, along with unique identities for the ISAs, to a third ISA (such as an ISA associated with another device intended to be securely connected to the other device).

In at least one of the various embodiments, SCMP 120, a management platform server, and/or high availability system 750 may be arranged to determine a primary ISA for a given set of paired ISAs. For example, given the shared identity the corresponding peer ISAs may be looked. Likewise, given one of the unique identities, the shared identity may be looked up.

In at least one of the various embodiments, configuration information provided by SCMP 120 and/or high availability system 750 for establishing the secure private network may include information for determining which of the paired ISAs is the primary ISA. In some embodiments, the primary ISA may be selected based on configuration information that may include rule-based policies for allocating ISA resources. For example, in at least one of the various embodiments, the SCMP 120 may be configured to assign the least utilized ISA of the peer set as the primary ISA for communicating with a third ISA. Accordingly, in at least one of the various embodiments, the unique identity corresponding to the primary ISA may be used to establish a secure communication channel (e.g., secure tunnel) between the third ISA.

At decision block 930, in at least one of the various embodiments, in response to a failure event at one of the ISAs (e.g., at a primary ISA), the high availability system may determine whether SCMP 120 is online and available. If SCMP 120 may be available, high availability system 750, control may flow to block 940; otherwise, control may flow to block 960.

In at least one of the various embodiments, a SCMP may be a network computer that may be separate from the network computer that may be the high availability system. Or, in at least one of the various embodiments, the management platform may be a separate process or processes than the high availability system.

In at least one of the various embodiments, the SCMP may have visibility to all of the ISAs, gateways computers, nodes, or the like, that are in the network. Accordingly, if the SCMP is available recovery actions associated with an ISA failure may be delegated to the SCMP. Alternatively, if the SCMP is unavailable, the high availability system may be tasked with re-establishing network communication between the affected nodes.

At block 940, in at least one of the various embodiments, high availability system 750 publishes the change to the network configuration to the management platform to enable the secondary ISA to take over the responsibilities of the failed primary ISA. In at least one of the various embodiments, high availability system 750 may employ the shared identity associated with the failed primary ISA to determine to the secondary ISA that may be arranged to take over for the failed primary ISA.

In at least one of the various embodiments, publishing the notification that an ISA has failed enabled the management platform to reconfigure the secure private network to account for the switch to the secondary ISA that will take over for the failed ISA. In at least one of the various embodiments, if necessary the management platform may publish updated network configuration information to one or more ISAs in the secure private network.

At block 950, in at least one of the various embodiments, high availability system 750 establishes a secure connection between the third ISA and the second ISA enabling secure private communication to continue. In at least one of the various embodiments, high availability system 750 may employ configuration information, if any, that may be provided by a management platform server.

At block 960, in at least one of the various embodiments, since SCMP 120, or other management platform servers, may be unavailable, high availability system 750 may recreate a secure tunnel between the third ISA and network 130 rather than just reporting the failure of the primary ISA to the management platform. Accordingly, in at least one of the various embodiments, the high availability system may provide configuration information to the third ISA and the secondary ISA to enable a secure network tunnel to be generated. In at least one of the various embodiments, high availability system 750 may confirm the identity of the third ISA and the secondary ISA in part by using the shared identity.

At block 970, in at least one of the various embodiments, high availability system 750 establishes a secure connection between the third ISA and the second ISA. Next, control may be returned to a calling process.

Illustrated Operating Environment

Figure 10:
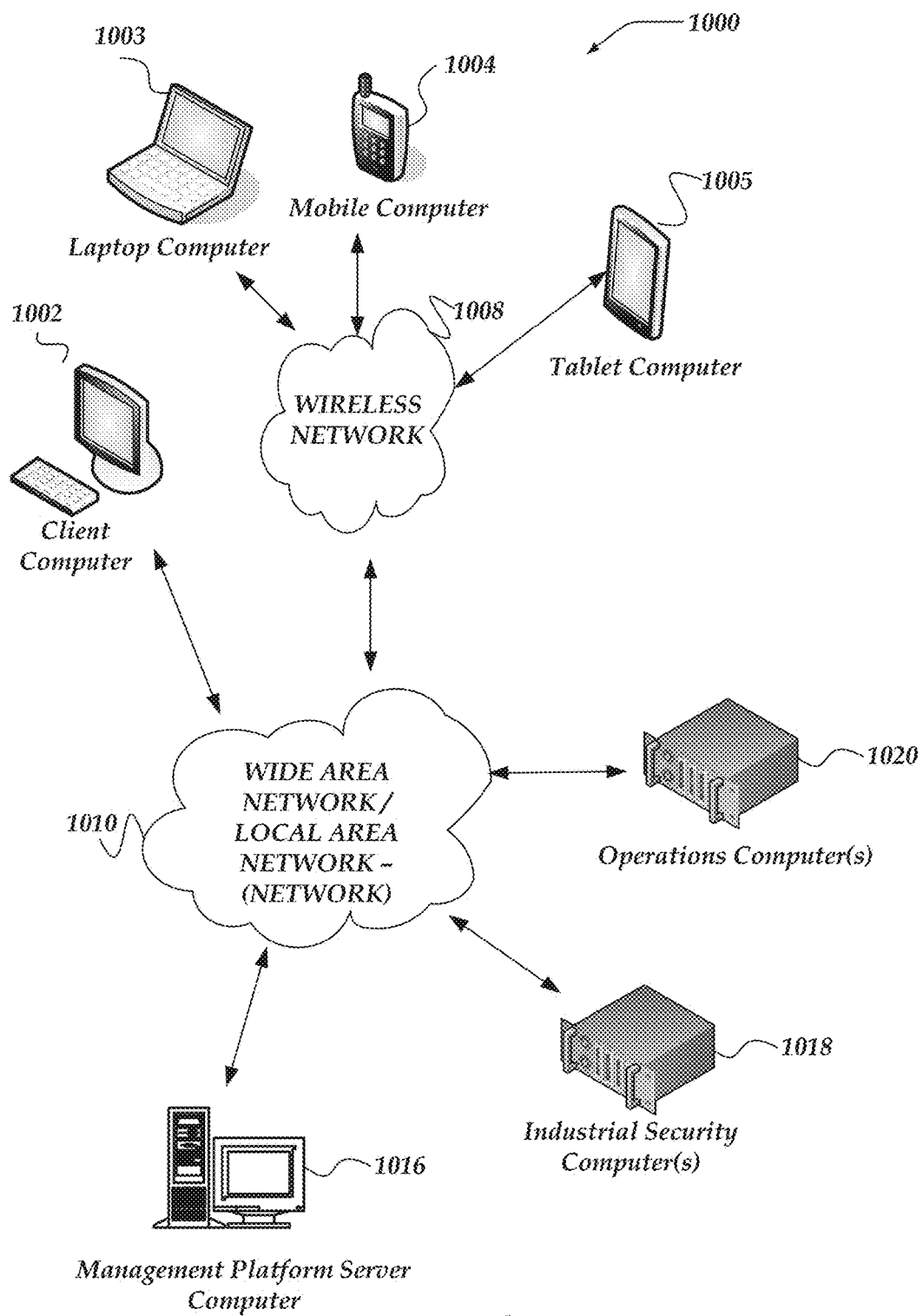
FIG. 10 shows components of one embodiment of an environment in which embodiments of the invention may be practiced.

FIG. 10 shows components of one embodiment of an environment in which embodiments of the invention may be practiced. Not all of the components may be required to practice the invention, and variations in the arrangement and type of the components may be made without departing from the spirit or scope of the invention. As shown, system 1000 of FIG. 1 includes local area networks (LANs)/wide area networks (WANs)—(network) 1010, wireless network 1008, client computers 1002-1005, Management Platform Server Computer 1016, Industrial Security Computer(s) 1018, Operations Computer(s) 1020, or the like.

At least one embodiment of client computers 1002-1005 is described in more detail below in conjunction with FIG. 11. In one embodiment, at least some of client computers 1002-1005 may operate over one or more wired and/or wireless networks, such as networks 1008, and/or 1010. Generally, client computers 1002-1005 may include virtually any computer capable of communicating over a network to send and receive information, perform various online activities, offline actions, or the like. In one embodiment, one or more of client computers 1002-1005 may be configured to operate within a business or other entity to perform a variety of services for the business or other entity. For example, client computers 1002-1005 may be configured to operate as a web server, firewall, client application, media player, mobile telephone, game console, desktop computer, or the like. However, client computers 1002-1005 are not constrained to these services and may also be employed, for example, as for end-user computing in other embodiments. It should be recognized that more or less client computers (as shown in FIG. 10) may be included within a system such as described herein, and embodiments are therefore not constrained by the number or type of client computers employed.

Computers that may operate as client computer 1002 may include computers that typically connect using a wired or wireless communications medium such as personal computers, multiprocessor systems, microprocessor-based or programmable electronic devices, network PCs, node computers, or the like. In some embodiments, client computers 1002-1005 may include virtually any portable computer capable of connecting to another computer and receiving information such as, laptop computer 1003, mobile computer 1004, tablet computers 1005, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 1002-1005 typically range widely in terms of capabilities and features. Moreover, client computers 1002-1005 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 1002-1005 also may include at least one other client application that is configured to receive and/or send content between another computer. The client application may include a capability to send and/or receive content, or the like. The client application may further provide information that identifies itself, including a type, capability, name, and the like. In one embodiment, client computers 1002-1005 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, management platform server computer 1016, industrial security computers 1018, operations computers 1020, or other computers.

Client computers 1002-1005 may further be configured to include a client application that enables an end-user to log into an end-user account that may be managed by another computer, such as management platform server computer 1016, industrial security computers 1018, operations computers 1020, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like.

Wireless network 1008 is configured to couple client computers 1003-1005 and its components with network 1010. Wireless network 1008 may include any of a variety of wireless sub-networks that may further overlay stand-alone ad-hoc networks, and the like, to provide an infrastructure-oriented connection for client computers 1003-1005. Such sub-networks may include mesh networks, Wireless LAN (WLAN) networks, cellular networks, industrial networks, or the like. In one embodiment, the system may include more than one wireless network.

Wireless network 1008 may further include an autonomous system of terminals, gateways, routers, and the like connected by wireless radio links, and the like. These connectors may be configured to move freely and randomly and organize themselves arbitrarily, such that the topology of wireless network 1008 may change rapidly.

Wireless network 1008 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 1003-1005 with various degrees of mobility. In one non-limiting example, wireless network 1008 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 1003-1005 and another computer, network, a cloud-based network, a cloud instance, or the like.

Network 1010 is configured to couple network computers with other computers, including, management platform server computer 1016, industrial security computer(s) 1018, operations computer(s) 1020, client computers 1002-1005 through wireless network 1008, or the like. Network 1010 is enabled to employ any form of computer readable media for communicating information from one electronic device to another. Also, network 1010 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 1010 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of management platform server computer 1016 is described in more detail below in conjunction with FIG. 12. Briefly, however, management platform server computer 1016 includes virtually any network computer capable of managing a network environment for one or more applications or services.

Although FIG. 10 illustrates management platform server computer 1016, industrial security computers 1018, operations computers 1020 each as a single computer, the innovations and/or embodiments are not so limited. For example, one or more functions of management platform server computer 1016, industrial security computers 1018, operations computers 1020, or the like, may be distributed across one or more distinct network computers. Moreover, management platform server computer 1016, industrial security computers 1018, operations computers 1020 are not limited to a particular configuration such as the one shown in FIG. 10. Thus, in one embodiment, management platform server computer 1016, industrial security computers 1018, operations computers 1020 may be implemented using a plurality of network computers. In other embodiments, server computer may operate as a plurality of network computers within a cluster architecture, a peer-to-peer architecture, or the like. Further, in at least one of the various embodiments, management platform server computer 1016, industrial security computers 1018, operations computers 1020 may be implemented using one or more cloud instances in one or more cloud networks.

Also, in at least one of the various embodiments, one or more management platform server computers, or at least some or all of the features thereof, may be incorporated in an industrial security computer, such as, industrial security computer 1018, or an operation computer, such as, operations computer 1020. Accordingly, these innovations and embodiments are not to be construed as being limited to a single environment, and other configurations, and architectures are also envisaged.

Illustrative Client Computer

Figure 11:
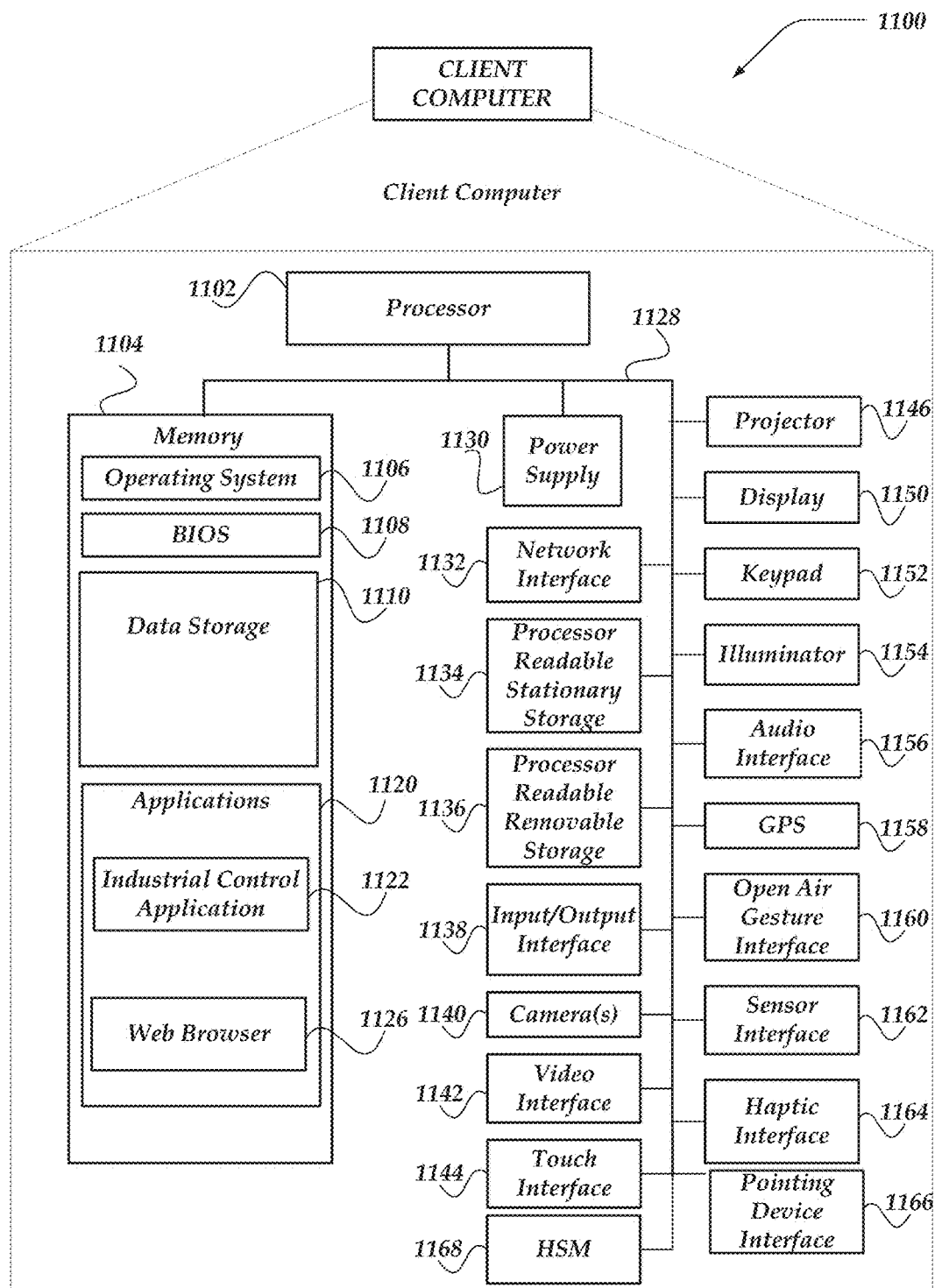
FIG. 11 shows one embodiment of a client computer that may be included in a system in accordance with at least one of the various embodiments.

FIG. 11 shows one embodiment of client computer 1100 that may include many more or less components than those shown. Client computer 1100 may represent, for example, at least one embodiment of mobile computers or client computers shown in FIG. 10.

Client computer 1100 may include processor 1102 in communication with memory 1104 via bus 1128. Client computer 1100 may also include power supply 1130, network interface 1132, audio interface 1156, display 1150, keypad 1152, illuminator 1154, video interface 1142, input/output interface 1138, haptic interface 1164, global positioning systems (GPS) receiver 1158, open air gesture interface 1160, sensor interface 1162, camera(s) 1140, projector 1146, pointing device interface 1166, processor-readable stationary storage device 1134, and processor-readable removable storage device 1136. Client computer 1100 may optionally communicate with a base station (not shown), or directly with another computer. And in one embodiment, although not shown, a gyroscope may be employed within client computer 1100 to measuring and/or maintaining an orientation of client computer 1100.

Power supply 1130 may provide power to client computer 1100. A rechargeable or non-rechargeable battery may be used to provide power. The power may also be provided by an external power source, such as an AC adapter or a powered docking cradle that supplements and/or recharges the battery.

Network interface 1132 includes circuitry for coupling client computer 1100 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 1132 is sometimes known as a transceiver, transceiving device, or network interface card (NIC).

Audio interface 1156 may be arranged to produce and receive audio signals such as the sound of a human voice. For example, audio interface 1156 may be coupled to a speaker and microphone (not shown) to enable telecommunication with others and/or generate an audio acknowledgement for some action. A microphone in audio interface 1156 can also be used for input to or control of client computer 1100, e.g., using voice recognition, detecting touch based on sound, and the like.

Display 1150 may be a liquid crystal display (LCD), gas plasma, electronic ink, light emitting diode (LED), Organic LED (OLED) or any other type of light reflective or light transmissive display that can be used with a computer. Display 1150 may also include a touch interface 1144 arranged to receive input from an object such as a stylus or a digit from a human hand, and may use resistive, capacitive, surface acoustic wave (SAW), infrared, radar, or other technologies to sense touch and/or gestures.

Projector 1146 may be a remote handheld projector or an integrated projector that is capable of projecting an image on a remote wall or any other reflective object such as a remote screen.

Video interface 1142 may be arranged to capture video images, such as a still photo, a video segment, an infrared video, or the like. For example, video interface 1142 may be coupled to a digital video camera, a web-camera, or the like. Video interface 1142 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 1152 may comprise any input device arranged to receive input from a user. For example, keypad 1152 may include a push button numeric dial, or a keyboard. Keypad 1152 may also include command buttons that are associated with selecting and sending images.

Illuminator 1154 may provide a status indication and/or provide light. Illuminator 1154 may remain active for specific periods of time or in response to events. For example, when illuminator 1154 is active, it may backlight the buttons on keypad 1152 and stay on while the client computer is powered. Also, illuminator 1154 may backlight these buttons in various patterns when particular actions are performed, such as dialing another client computer. Illuminator 1154 may also cause light sources positioned within a transparent or translucent case of the client computer to illuminate in response to actions.

Further, client computer 1100 may also comprise hardware security module (HSM) 1168 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 1168 may be a stand-alone computer, in other cases, HSM 1168 may be arranged as a hardware card that may be added to a client computer.

Client computer 1100 may also comprise input/output interface 1138 for communicating with external peripheral devices or other computers such as other client computers and network computers. The peripheral devices may include an audio headset, display screen glasses, remote speaker system, remote speaker and microphone system, and the like. Input/output interface 1138 can utilize one or more technologies, such as Universal Serial Bus (USB), Infrared, WiFi, WiMax, Bluetooth™, and the like.

Client computer 1100 may also include sensors 1162 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors 1162 may be one or more hardware sensors that collect and/or measure data that is external to client computer 1100.

Haptic interface 1164 may be arranged to provide tactile feedback to a user of the client computer. For example, the haptic interface 1164 may be employed to vibrate client computer 1100 in a particular way when another user of a computer is calling. Temperature interface 1162 may be used to provide a temperature measurement input and/or a temperature changing output to a user of client computer 1100. Open air gesture interface 1160 may sense physical gestures of a user of client computer 1100, for example, by using single or stereo video cameras, radar, a gyroscopic sensor inside a computer held or worn by the user, or the like. Camera 1140 may be used to track physical eye movements of a user of client computer 1100.

GPS transceiver 1158 can determine the physical coordinates of client computer 1100 on the surface of the Earth, which typically outputs a location as latitude and longitude values. GPS transceiver 1158 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 1100 on the surface of the Earth. It is understood that under different conditions, GPS transceiver 1158 can determine a physical location for client computer 1100. In at least one embodiment, however, client computer 1100 may, through other components, provide other information that may be employed to determine a physical location of the client computer, including for example, a Media Access Control (MAC) address, IP address, and the like.

Human interface components can be peripheral devices that are physically separate from client computer 1100, allowing for remote input and/or output to client computer 1100. For example, information routed as described here through human interface components such as display 1150 or keyboard 1152 can instead be routed through network interface 1132 to appropriate human interface components located remotely. Examples of human interface peripheral components that may be remote include, but are not limited to, audio devices, pointing devices, keypads, displays, cameras, projectors, and the like. These peripheral components may communicate over a Pico Network (piconet) such as Bluetooth™, Zigbee™ and the like.

A client computer may include web browser application 1126 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 1104 may include RAM, ROM, and/or other types of memory. Memory 1104 illustrates an example of computer-readable storage media (devices) for storage of information such as computer-readable instructions, data structures, program modules or other data. Memory 1104 may store BIOS 1108 for controlling low-level operation of client computer 1100. The memory may also store operating system 1106 for controlling the operation of client computer 1100. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 1104 may further include one or more data storage 1110, which can be utilized by client computer 1100 to store, among other things, applications 1120 and/or other data. For example, data storage 1110 may also be employed to store information that describes various capabilities of client computer 1100. The information may then be provided to another device or computer based on any of a variety of events, including being sent as part of a header during a communication, sent upon request, or the like. Data storage 1110 may also be employed to store social networking information including address books, buddy lists, aliases, user profile information, or the like. Data storage 1110 may further include program code, data, algorithms, and the like, for use by a processor, such as processor 1102 to execute and perform actions. In one embodiment, at least some of data storage 1110 might also be stored on another component of client computer 1100, including, but not limited to, non-transitory processor-readable removable storage device 1136, processor-readable stationary storage device 1134, or even external to the client computer.

Applications 1120 may include computer executable instructions which, when executed by client computer 1100, transmit, receive, and/or otherwise process instructions and data. Applications 1120 may include, for example, industrial control application 1122. In at least one of the various embodiments, overlay industrial control application 1122 may be used to exchange communications to and from management platform server computer 1016, industrial security computers 1018, operations server computer 1120, ISA, gateway computers, or the like, including, but not limited to, queries, searches, API calls, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 1100 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the client computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 12:
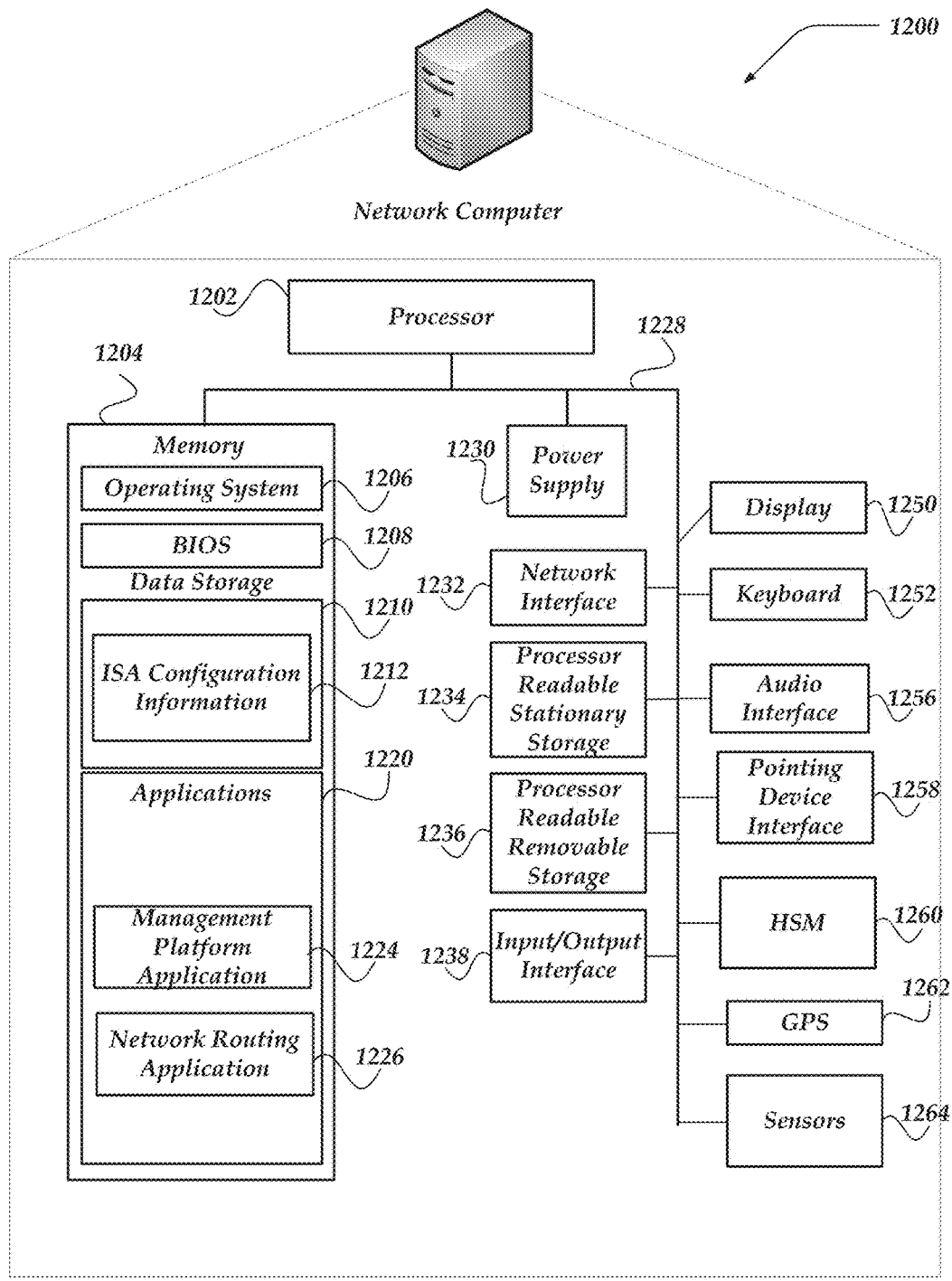
FIG. 12 shows one embodiment of a network computer, in accordance with at least one of the various embodiments.

FIG. 12 shows one embodiment of network computer 1200 that may be included in a system implementing the invention. Network computer 1200 may include many more or less components than those shown in FIG. 12. However, the components shown are sufficient to disclose an illustrative embodiment for practicing these innovations. Network computer 1200 may represent, for example, one embodiment of at least one of management platform server computer 1016, industrial security computer(s) 1018, or industrial operations computer(s) 1020 of FIG. 10.

As shown in the figure, network computer 1200 includes a processor 1202 in communication with a memory 1204 via a bus 1228. Network computer 1200 also includes a power supply 1230, network interface 1232, audio interface 1256, display 1250, keyboard 1252, input/output interface 1238, processor-readable stationary storage device 1234, and processor-readable removable storage device 1236. Power supply 1230 provides power to network computer 1200.

Network interface 1232 includes circuitry for coupling network computer 1200 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 1232 is sometimes known as a transceiver, transceiving device, or network interface card (NIC). Network computer 1200 may optionally communicate with a base station (not shown), or directly with another computer.

Audio interface 1256 is arranged to produce and receive audio signals such as the sound of a human voice. For example, audio interface 1256 may be coupled to a speaker and microphone (not shown) to enable telecommunication with others and/or generate an audio acknowledgement for some action. A microphone in audio interface 1256 can also be used for input to or control of network computer 1200, for example, using voice recognition.

Display 1250 may be a liquid crystal display (LCD), gas plasma, electronic ink, light emitting diode (LED), Organic LED (OLED) or any other type of light reflective or light transmissive display that can be used with a computer. Display 1250 may be a handheld projector or pico projector capable of projecting an image on a wall or other object.

Network computer 1200 may also comprise input/output interface 1238 for communicating with external devices or computers not shown in FIG. 12. Input/output interface 1238 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 1262 can determine the physical coordinates of network computer 1200 on the surface of the Earth, which typically outputs a location as latitude and longitude values. GPS transceiver 1262 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 1200 on the surface of the Earth. It is understood that under different conditions, GPS transceiver 1262 can determine a physical location for network computer 1200. In at least one embodiment, however, network computer 1200 may, through other components, provide other information that may be employed to determine a physical location of the client computer, including for example, a Media Access Control (MAC) address, IP address, and the like.

Human interface components can be physically separate from network computer 1200, allowing for remote input and/or output to network computer 1200. For example, information routed as described here through human interface components such as display 1250 or keyboard 1252 can instead be routed through the network interface 1232 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 1258 to receive user input.

Memory 1204 may include Random Access Memory (RAM), Read-Only Memory (ROM), and/or other types of memory. Memory 1204 illustrates an example of computer-readable storage media (devices) for storage of information such as computer-readable instructions, data structures, program modules or other data. Memory 1204 stores a basic input/output system (BIOS) 1208 for controlling low-level operation of network computer 1200. The memory also stores an operating system 1206 for controlling the operation of network computer 1200. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 1204 may further include one or more data storage 1210, which can be utilized by network computer 1200 to store, among other things, applications 1220 and/or other data. For example, data storage 1210 may also be employed to store information that describes various capabilities of network computer 1200. The information may then be provided to another device or computer based on any of a variety of events, including being sent as part of a header during a communication, sent upon request, or the like. Data storage 1210 may also be employed to store social networking information including address books, buddy lists, aliases, user profile information, or the like. Data storage 1210 may further include program code, data, algorithms, and the like, for use by a processor, such as processor 1202 to execute and perform actions such as those actions described below. In one embodiment, at least some of data storage 1210 might also be stored on another component of network computer 1200, including, but not limited to, non-transitory media inside processor-readable removable storage device 1236, processor-readable stationary storage device 1234, or any other computer-readable storage device within network computer 1200, or even external to network computer 1200. Data storage 1210 may include, for example, industrial security appliance (ISA) configuration information 1212, or the like. ISA configuration information 1212 may contain various data generated for defining ISA unique identities, ISA shared identities as well as, routing information, and one or more policies associated with one or more mesh networks, or the like.

Applications 1220 may include computer executable instructions which, when executed by network computer 1200, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 1220 may include management platform application 1224, and/or network routing application 1226 which may be enabled to perform actions further described below. In at least one of the various embodiments, one or more of the applications may be implemented as modules and/or components of another application. Further, in at least one of the various embodiments, applications may be implemented as operating system extensions, modules, plugins, or the like.

Furthermore, in at least one of the various embodiments, management platform application 1224, and/or network routing application 1226 may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to management platform application 1224, and/or network routing application 1226 may be provisioned and de-commissioned automatically.

Also, in at least one of the various embodiments, management platform application 1224, network routing application 1226, or the like, may located in virtual servers running in a cloud-based computing environment rather than being tied to one or more specific physical network computers.

Management platform application 1224 may be a process or service that is arranged to communicate with one or more industrial security computers, such as, industrial computers 1018, and/or one or more operations computers, such as, operations computers 1020. Further, in at least one of the various embodiments, management platform application 1224 may be arranged to provide configuration information to one or more of industrial computers 1018, or operations computers 1020. Also, in at least one of the various embodiments, management platform application 1224 may be arranged to obtain notifications, logging information, status reports, security alerts, or the like, or combination thereof, from one or more of industrial computers 1018, operations computers 1020, ISAs, gateway computer, node computers, or the like.

Further, network computer 1200 may also comprise hardware security module (HSM) 1260 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 1260 may be a stand-alone network computer, in other cases, HSM 1260 may be arranged as a hardware card that may be installed in a network computer.

Network computer 1200 may also include sensors 1264 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors 1264 may be one or more hardware sensors that collect and/or measure data that is external to network computer 1200.

Additionally, in one or more embodiments (not shown in the figures), network computer 1200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), network computer 1200 may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

Figure 13:
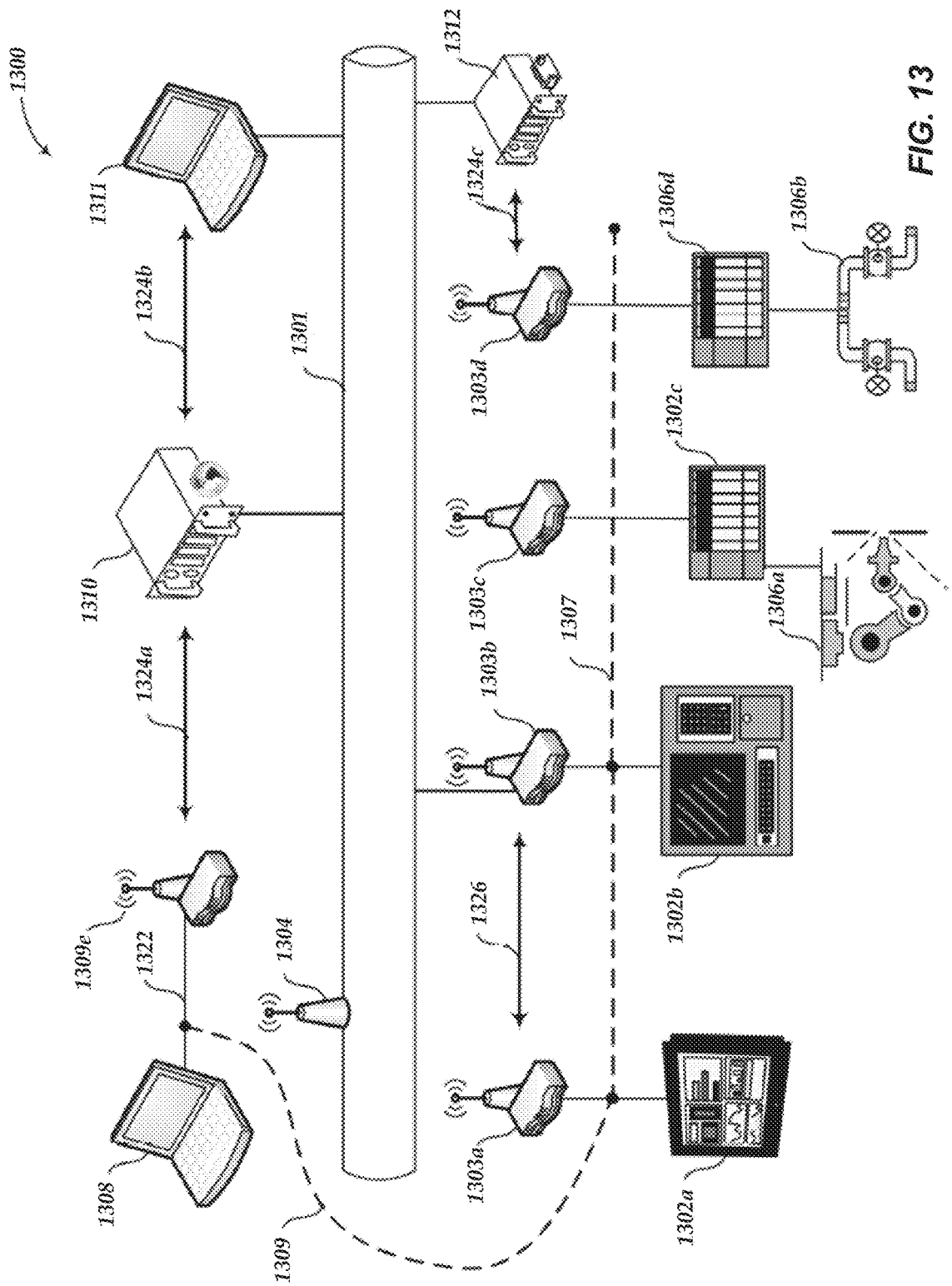
FIG. 13 shows a logical architecture of a networked environment in accordance with at least one of the various embodiments.

FIG. 13 shows a logical architecture of networked environment 1300 that is in accordance with at least one of the various embodiments. In at least one of the various embodiments, business network 1301 is coupled to a plurality of operations computer 1302a-1302d (four shown, collectively 1302) via a plurality of industrial security application computers (ISAs) 1303a-1303e (five shown, collectively 1303). ISAs 1303 may be coupled directly to the business network 1301, or wirelessly via a wireless connection port 1304. Each of the operations computers 1302 may be coupled directly or wirelessly to one or more industrial computers 1306a-1306b (two shown, collectively 1306), such as, for example, an automated manufacturing machine or tooling (e.g., numerically controlled machinery) that processes a product. The ISAs 1303 communicate with one another via a private network 1307. A remote user (e.g., a remote engineer) 1308 may connect to the private network 1307 via a remote access wireless communication path 1309. In at least one of the various embodiments, management platform computer 1310 and an associated, such as, user station 1311 may be coupled to business network 1301.

In at least one of the various embodiments, management platform computer 1310, ISAs 1303, and user station 1311 may be, for example one or more network computers, such as, network computer 1200 or one or more client computers, such as, client computer 1100. ISAs 1303 can be introduced into networked environment 1300 as protective devices, each ISA 1303 associated with, and coupled to, a particular operations computer 1302. ISAs 1303 can be provider edge (PE) devices/computers that provide dynamic, secure connectivity among operations computers 1302, and between operations computers 1302 and business network 1301. In at least one of the various embodiments, ISAs can be physical computers or they can be implemented as virtualized computers. A virtual ISA may constitute software that may perform the same or similar functions as a corresponding processor-based computer. The software implementing a virtual ISA can be hosted on a system or a device that is not otherwise dedicated to providing secured networked communications, e.g., a local device, a remote device, client computer, network computer, or a server in a cloud-based computing environment. As described above ISAs may also be referred to as gateway computers that may be employed to isolate the physical network from nodes, such as industrial computers and workstations.

In at least one of the various embodiments, private network 1307 may be a virtual network—a logical construct (shown as a dotted line in FIG. 13)—that may be overlaid onto an existing physical infrastructure that includes existing business network 1301 and the existing operations computers 1302. Further, in at least one of the various embodiments, private network 1307 may be a virtual private LAN service (VPLS) that connects physically separate LAN segments (e.g., the business network and the industrial network) into a single logical LAN segment. However, the private network provides an isolated environment that is segmented from the business network. Private network 1307 may be configured as a dynamic mesh network. The term "full mesh" refers to a mesh network topology in which every node is coupled to every other node. A dynamic mesh network is a policy-constrained mesh in which each communicates with only certain other designated nodes. Segments of private network 1307 may be enabled or disabled by management platform computer 1310, in response to mesh policy decisions received from a user via user station 1311.

In at least one of the various embodiments, DHCP server 1312 may be coupled to business network 1301 to administer connecting various corporate devices to business network 1301. Communications traffic 1324a-1324b on the business network side of communications environment 1300 can be HTTP Web traffic which is encrypted. However, communications traffic 1324c to and from DHCP server 1312 may be non-encrypted. Communications traffic 1326 between ISAs 1303 coupled to the private overlay network may be encrypted. For enhanced security, management of connections to the private network may be administered in a secure, distributed fashion by ISAs 1303.

Operations computers 1302 may take various forms. For example, the operations computers 1302 may be industrial equipment controllers that control processing equipment 1306a in a manufacturing operation. Additionally or alternatively, operations computers 1302 may be distributed utility devices for controlling utilities 1306b (e.g., factory utilities, municipal water systems, power systems, energy delivery systems, and the like). Alternatively, operations computers 1302 may be controllers or workstations for operating medical equipment (e.g., medical imaging equipment) in a medical facility. Alternatively, operations computers 1302 can themselves be networks of operational equipment, for example, networks located at different manufacturing sites that are part of the same business or corporation. Alternatively, operations computer 1302 can be workstations or servers in an office-based operation.

In at least one of the various embodiments, each operations device 1302 may be logically or otherwise associated with one or more industrial devices, such as, industrial devices 1306. Operations computer 1302 can be processor-based customer edge (CE) devices that may take any of a large variety of forms, including but not limited to personal computers (e.g., client computers, network computers, desktop computers, laptop computers, notebook computers, tablet computers, smart phones, workstation computers, and/or mainframe computers, and the like.) At least operations computers 1302, ISAs 1303, and management platform computer 1310 may be capable of communication, for example via one or more networks 1307, (e.g., Wide Area Networks, Local Area Networks, or packet switched communications networks such as the Internet, Worldwide Web portion of the Internet, extranets, intranets, and/or various other types of telecommunications networks such as cellular phone and data networks, and plain old telephone system (POTS) networks. See, also, wireless network 1008, network 1010 in FIG. 10. One or more communications interface devices may provide communications between operations computers 1302 and network(s) 1307, 1301. The communications interface devices may take any of a wide variety of forms, including modems (e.g., DSL modem, cable modem), routers, network switches, and/or bridges, etc. The communications interface devices can be built into the operations devices or, if separate from operations computers 1302, can communicate with the operations computers 1302 using a wired communication channel, a wireless communication channel, or combinations thereof. The operations computers 1302 may be coupled to an industrial network.

In at least one of the various embodiments, operations computers 1302, ISAs 1303, and management platform computer 1310 include at least one non-transitory processor-readable storage medium (e.g., hard drive, RFID, RAM). The storage medium stores instructions for causing the associated device to perform various functions as described below.

In many implementations the non-transitory processor-readable storage medium may constitute a plurality of non-transitory storage media. The plurality of non-transitory storage media may be commonly located at a common location, or distributed at a variety of remote locations. Databases may be implemented in one, or across more than one, non-transitory computer- or processor-readable storage media. Such database(s) may be stored separately from one another on separate non-transitory processor-readable storage medium or may be stored on the same non-transitory processor-readable storage medium as one another. The non-transitory processor-readable storage medium may be co-located with management platform computer 1310, for example, in the same room, building or facility. Alternatively, the non-transitory processor-readable storage medium may be located remotely from management platform 1310, for example in a different facility, city, state or country. Electronic or digital information, files or records or other collections of information may be stored at specific locations in non-transitory processor-readable media, thus are logically addressable portions of such media, which may or may not be contiguous.

Networked environment 1300 shown in FIG. 13 is representative. Typical networked environments may include additional, or fewer, computer systems and entities than illustrated in FIG. 13.

Furthermore, in at least one of the various embodiments, client computer 1100 or network computer 1100 is arranged to include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like.

For example, in at least one embodiment, geolocation information (such as latitude and longitude coordinates, or the like) is collected by a hardware GPS sensor and subsequently employed in the identification/determination of the one or more management platform servers, ISAs, gateway computers, or the like, may be used to establish secure private networks and network paths. Similarly, in at least one embodiment, weather information (such as temperature, atmospheric pressure, wind speed, humidity, or the like) is collected by a hardware weather sensor and subsequently employed in the identification/determination of the one or more management platform servers, ISAs, gateway computers, or the like, may be used to establish secure private networks and network paths. Additionally, in at least one embodiment, electrical power information (such as voltage, current, frequency, or the like) is collected by a hardware electrical power sensor and subsequently employed in the identification/determination of the one or more management platform servers, ISAs, gateway computers, or the like, may be used to establish secure private networks and network paths.

Generalized Operations

Figure 14:
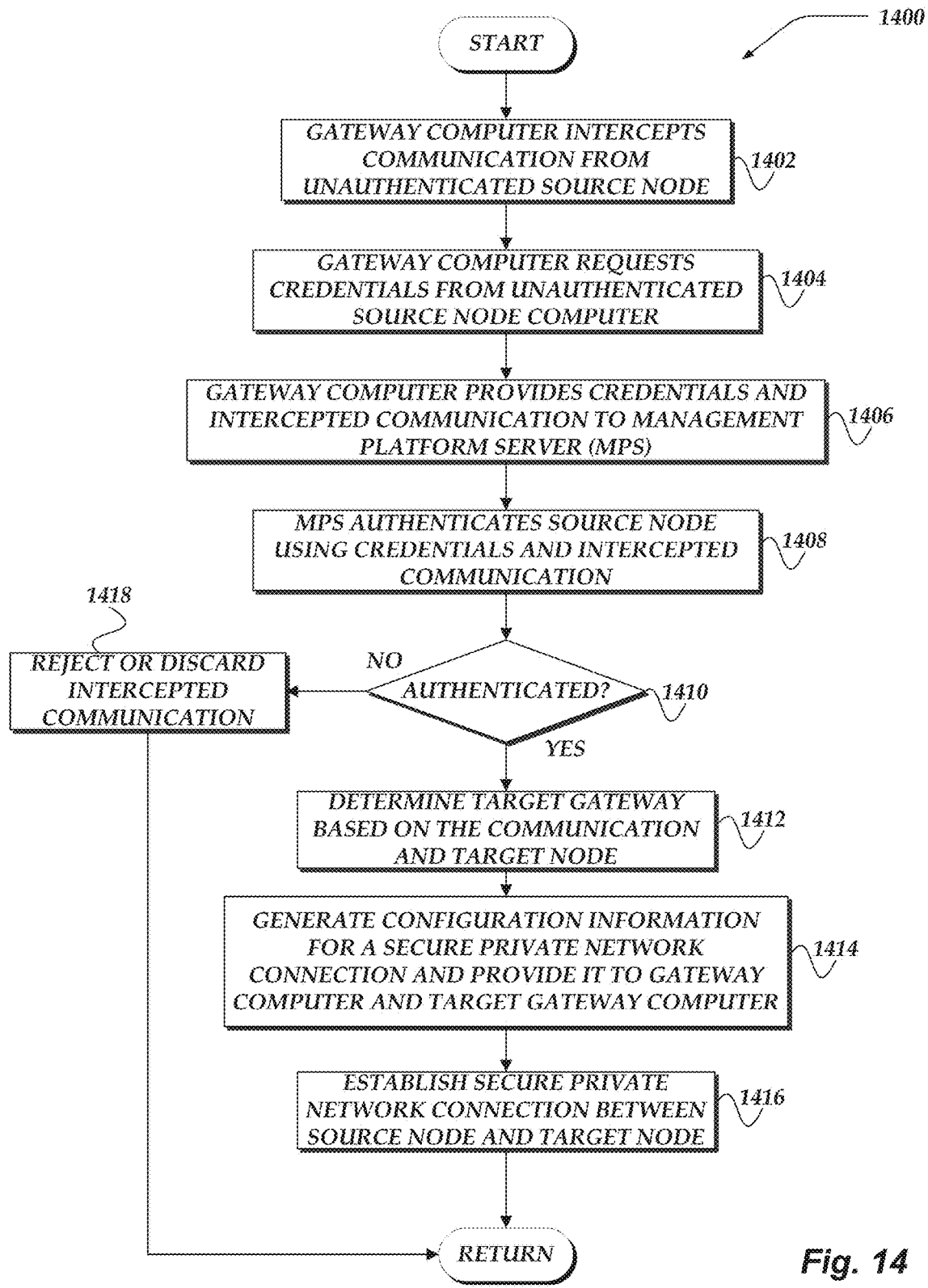
FIG. 14 illustrates an overview flowchart of a process for performing actions via devices that establish a secure private network in accordance with at least one of the various embodiments.

FIG. 14 represents the generalized operation of performing actions via devices that establish a secure private network in accordance with at least one of the various embodiments. In at least one of the various embodiments, process 1400 described in conjunction with FIG. 14 may be implemented by and/or executed on a management platform server computer, an industrial security computer, a gateway computer, a network computer, or the like, such as, network computer 1200 of FIG. 12. In other embodiments, these processes, or portions thereof, may be implemented by and/or executed on a plurality of network computers. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, the process described in conjunction with FIG. 14 may be used for performing actions via devices that establish a secure private network in accordance with at least one of the various embodiments and/or architectures such as those described in conjunction with FIGS. 1-13. Further, in at least one of the various embodiments, some or all of the actions performed by process 1400 may be executed in part by authentication system 450, SCMP 120, management platform application 1124, and network routing application 1226, or the like, or combination thereof.

FIG. 14 illustrates an overview flowchart of process 1400 for performing actions via devices that establish a secure private network in accordance with at least one of the various embodiments. After a start block, at block 1402, in at least one of the various embodiments, a gateway computer may intercept one or more communications from an unauthenticated source node computer. In at least one of the various embodiments, a gateway computer, including industrial security applications, may be arranged to automatically intercept some or all of the communications from one or more source node computers. At block 1404, in at least one of the various embodiments, the gateway computer may generate a request for credentials and provide it to the unauthenticated source node computer.

As described above, the gateway computer may generate a request for credentials from unauthenticated source computers that may have provided intercepted communications. In some cases, the source node computer may be expressly requesting to be authenticated. In other cases, the source node computer may be directing a communication to a target node computer in the secure private network. In either cases, the gateway computer may intercept the communication and provide a request for authentication credentials to the requesting unauthenticated source node.

At block 1406, in at least one of the various embodiments, the gateway computer may provide the credentials from the unauthenticated source node computer along with the intercepted communication to a management platform server computer.

At block 1408, in at least one of the various embodiments, a management platform server computer may authenticate the source node and/or the communication based on the credentials and the intercepted communication. In at least one of the various embodiments, authentication may take at least two steps. In one step the management platform server computer may authenticate the credentials. In at least one of the various embodiments, in another step the management platform server computer may validate that the type of communication and/or communication request is authorized for the set of provided authentication credentials. Also, in at least one of the various embodiments, the management platform server may validate that the credentials enable the source node computer to access the requested target node computer.

At decision block 1410, in at least one of the various embodiments, if the unauthenticated source node computer is authenticated, control may flow to block 1412; otherwise, control may be flow to block 1418. In at least one of the various embodiments, if the authentication credentials fail to be validated and authenticated, the communication may be rejected. Likewise, in at least one of the various embodiments, if the request or communication exceeds the authorization level associated with the credentials, the communication may be rejected.

At block 1412, in at least one of the various embodiments, the management platform server may determine a target gateway computer based on the intercepted communication and the target node. In at least one of the various embodiments, the communication may include network information such as source network address and destination network address that may be used to determine the target node computer. Likewise, the target node computer may be coupled to a particular gateway computer (referred to as a target gateway computer).

In at least one of the various embodiments, the management platform server computer may have access to network configuration information that indicates which node computers are associated with which gateway computer. Accordingly, the management platform server may employ this information to identify the target gateway computer that may be associated with the target node computer.

In at least one of the various embodiments, the management platform server may determine the target gateway computer and/or a network path to the target gateway computer based on one or more characteristics of the network. In at least one of the various embodiments, such characteristics may include, current performance of the secure private network, expected performance of the secure private network, performance of node computers on the secure private network, performance and capabilities of equipment coupled to one or more node computers on the secure private network, or the like, or combination thereof.

In at least one of the various embodiments, the communication may include information that should be sent to perform a particular task rather than an address to a particular target node. Or, in at least one of the various embodiments, the communication may identify a class or category of target nodes rather than a specific target node computer. Accordingly, in at least one of the various embodiments, the management platform server may be arranged to determine the specific target node computer from those node computers that meet the criterion expressed in the communication from the source node computer.

In at least one of the various embodiments, the particular target node computer may be selected based on one or more capabilities and/or features of the node. For example, in at least one of the various embodiments, in an automated industrial paint shop the communication may be a request to paint a product or component, the request may include a particular color, paint type, or the like. In this example, the management platform server may determine the target gateway based on its being coupled to the paint machine that is loaded with the correct color paint or paint type.

In other embodiments, capability characteristics, such as, types of fasteners, nails, staples, glue, and so on, available at a workstation (e.g., industrial robot) may be considered by the management platform server when determine a target gateway computer and/or target node computer.

In at least one of the various embodiments, other capability characteristics, such as, speed/cycle-rate, size, capacity, physical location, temperature, maintenance history, engineering tolerances, or the like, or combination thereof may be used to determine the target gateway computer and/or the target node computer.

At block 1414, in at least one of the various embodiments, the management platform server may generate configuration information for a secure private network connection and provide it to the gateway computer and the target gateway computer. In at least one of the various embodiments, the configuration information may include sufficient information for the gateway computer to communication with the determined target gateway computer.

At block 1416, in at least one of the various embodiments, a secure private network connection may be made between the authenticated source node and the target node. In at least one of the various embodiments, the gateway computer along with the target gateway computer may employ the configuration information provided by the management platform server to establish a connection over the mesh network, secure private network, or the like, to enable secure communication between the source node computer and the target node computer. At block 1418, in at least one of the various embodiments, since the source node is not authenticated, the intercepted communication may be discarded or otherwise ignored. Next, control may be returned to a calling process.

What is claimed as new and desired to be protected by Letters Patent of the United States is:

1. A method for managing secure network communication, wherein execution of logic by one or more processors of a gateway computer performs actions, comprising:
    intercepting a communication from an unauthenticated source node computer directed to a target node computer;
    providing credentials of the unauthenticated source node computer in a response to the gateway computer and the intercepted communication to a management platform server that performs further actions, including:
        determining a target gateway computer that corresponds to the target node computer based on content of the intercepted communication; and
        providing configuration information for generating a secure private network connection between the gateway computer and the target gateway computer; and
    establishing the secure private network connection to the target gateway computer based on the configuration information, wherein a single identifier shared by the target gateway computer and another gateway computer is employed by the other gateway computer to replace the target gateway computer when the target gateway computer is in a failure state; and
    securely sending the intercepted communication to the target gateway computer over the secure private network connection.

2. The method of claim 1, wherein the management platform server performs further actions comprising employing one or more characteristics of one or more networks to determine one or more of the target gateway computer or the target node computer.

3. The method of claim 1, wherein the management platform server performs further actions, comprising:
    employing information in the intercepted communication to identify one or more of a category of the target node computer, a class of the target node computer, or a task to be performed by the target node computer; and
    employing the information to determine one or more of the target node computer or the target gateway computer.

4. The method of claim 1, wherein the management platform server performs further actions comprising authenticating the unauthenticated source node computer based on its credentials and the intercepted communication.

5. The method of claim 1, wherein the target gateway computer securely provides the intercepted communication to the target node computer over one or more networks.

6. The method of claim 1, wherein the target gateway computer performs actions, including:
    employing one or more industrial networks to communicate with one or more of the target node computer or the gateway computer; and
    employing one or more non-industrial networks to communicate with one or more of the gateway computer or the management platform.

7. The method of claim 1, wherein the single shared identifier includes one or more of a cryptographic key, cryptographic hash, or cryptographic certificate, and wherein the single shared identifier is mapped to one or more of a plurality of node computers.

8. A gateway computer that includes one or more processors that execute instructions to manage secure network communication, wherein execution of the instructions performs actions, comprising:
    instantiating a management platform server that performs actions, comprising:
        intercepting a communication from an unauthenticated source node computer to a target node computer
        receiving credentials of the unauthenticated source node computer in a response to the gateway computer;
        determining a target gateway computer that corresponds to the target node computer based on content of the intercepted communication;
        providing configuration information for generating a secure private network connection between the gateway computer and the target gateway computer;
        establishing the secure private network connection to the target gateway computer based on the configuration information, wherein a single identifier shared by the target gateway computer and another gateway computer is employed by the other gateway computer to replace the target gateway computer when the target gateway computer is in a failure state; and
        securely sending the intercepted communication to the target gateway computer over the secure private network connection.

9. The gateway computer of claim 8, wherein the management platform server performs further actions comprising employing one or more characteristics of one or more networks to determine one or more of the target gateway computer or the target node computer.

10. The gateway computer of claim 8, wherein the management platform server performs further actions, comprising:
    employing information in the intercepted communication to identify one or more of a category of the target node computer, a class of the target node computer, or a task to be performed by the target node computer; and
    employing the information to determine one or more of the target node computer or the target gateway computer.

11. The gateway computer of claim 8, wherein the management platform server performs further actions comprising authenticating the unauthenticated source node computer based on its credentials and the intercepted communication.

12. The gateway computer of claim 8, wherein the target gateway computer securely provides the intercepted communication to the target node computer over one or more networks.

13. The gateway computer of claim 8, wherein the target gateway computer performs actions, including:
   employing one or more industrial networks to communicate with one or more of the target node computer or the gateway computer; and
   employing one or more non-industrial networks to communicate with one or more of the gateway computer or the management platform.

14. The gateway computer of claim 8, wherein the single shared identifier includes one or more of a cryptographic key, cryptographic hash, or cryptographic certificate, and wherein the single shared identifier is mapped to one or more of a plurality of node computers.

15. A computer readable non-transitory storage media that includes instructions to manage secure network communication, wherein execution of the instructions by one or more processors performs actions, comprising:
   instantiating a management platform server that performs actions, comprising:
      intercepting a communication from an unauthenticated source node computer to a target node computer
      receiving credentials of the unauthenticated source node computer in a response to the gateway computer;
      determining a target gateway computer that corresponds to the target node computer based on content of the intercepted communication;
      providing configuration information for generating a secure private network connection between the gateway computer and the target gateway computer;
      establishing the secure private network connection to the target gateway computer based on the configuration information, wherein a single identifier shared by the target gateway computer and another gateway computer is employed by the other gateway computer to replace the target gateway computer when the target gateway computer is in a failure state; and
      securely sending the intercepted communication to the target gateway computer over the secure private network connection.

16. The media of claim 15, wherein the management platform server performs further actions comprising employing one or more characteristics of one or more networks to determine one or more of the target gateway computer or the target node computer.

17. The media of claim 15, wherein the management platform server performs further actions, comprising:
   employing information in the intercepted communication to identify one or more of a category of the target node computer, a class of the target node computer, or a task to be performed by the target node computer; and
   employing the information to determine one or more of the target node computer or the target gateway computer.

18. The media of claim 15, wherein the management platform server performs further actions comprising authenticating the unauthenticated source node computer based on its credentials and the intercepted communication.

19. The media of claim 15, wherein the target gateway computer performs actions, including:
   employing one or more industrial networks to communicate with one or more of the target node computer or the gateway computer; and
   employing one or more non-industrial networks to communicate with one or more of the gateway computer or the management platform.

20. The media of claim 15, wherein the single shared identifier includes one or more of a cryptographic key, cryptographic hash, or cryptographic certificate, and wherein the single shared identifier is mapped to one or more of a plurality of node computers.

\* \* \* \* \*